US012374234B2

(12) United States Patent
Navarro et al.

(10) Patent No.: US 12,374,234 B2
(45) Date of Patent: Jul. 29, 2025

(54) SIMULATOR FOR VALUE INSTRUMENT NEGOTIATION TRAINING

(71) Applicant: The Toronto-Dominion Bank, Toronto (CA)

(72) Inventors: Miguel Navarro, Ewing, NJ (US); Sadia Zaidi, Robbinsville, NJ (US); Mohamed Abbas, Jersey City, NJ (US)

(73) Assignee: The Toronto-Dominion Bank, Toronto (CA)

( * ) Notice: Subject to any disclaimer, the term of this patent is extended or adjusted under 35 U.S.C. 154(b) by 775 days.

(21) Appl. No.: 17/553,093

(22) Filed: Dec. 16, 2021

(65) Prior Publication Data
US 2022/0108320 A1 Apr. 7, 2022

Related U.S. Application Data

(63) Continuation of application No. 16/427,606, filed on May 31, 2019, now Pat. No. 11,244,319.

(51) Int. Cl.
*G06Q 20/04* (2012.01)
*G06Q 20/40* (2012.01)
(Continued)

(52) U.S. Cl.
CPC ........... *G09B 19/18* (2013.01); *G06Q 20/042* (2013.01); *G06Q 20/4016* (2013.01); *G06T 5/50* (2013.01);
(Continued)

(58) Field of Classification Search
CPC ............. G06Q 20/385; G06Q 20/3674; G06Q 20/4016; H04L 63/062
See application file for complete search history.

(56) References Cited

U.S. PATENT DOCUMENTS 3,733,927 A 5/1973 Uozumi
8,290,237 B1 10/2012 Burks et al.
(Continued)

FOREIGN PATENT DOCUMENTS

CA 3046998 A1 * 11/2020 ......... G06K 9/00442

OTHER PUBLICATIONS

Augmented reality-based advertising strategies for paper leallets Lochtenfeld, Markus; Daiber, Florian; Böhmer, Matthais, Gehring, Sven Source: UbiComp 2013 Adjunct—Adjunct Publication of the 2013 ACM Conference on Ubiquitous Computing, p. 1015-1021, 2013, UbiComp 2013 Adjunct—Adjunct Publication of the 2013 ACM Conference on Ubiquitous Computing;
(Continued)

*Primary Examiner* — Richard C Weisberger
(74) *Attorney, Agent, or Firm* — Rowand LLP

(57) ABSTRACT

A simulator for providing teaching and training related to negotiable instruments is disclosed. The provided simulation includes a simulated negotiable instrument. The simulator captures an image of a portion of an environment including a piece of printed collateral. The simulator then displays an augmented reality version of the environment. Displaying the augmented reality version of the environment includes detecting the printed collateral in the image, replacing the printed collateral in the image of the portion of the environment with an image of the negotiable instrument to yield an image depicting the portion of the environment as including the negotiable instrument, and presenting, the image depicting the portion of the environment as including the negotiable instrument. The simulator provides an indication of an outcome of a simulated negotiation of the negotiable instrument. Related methods and computer-readable media are disclosed.

21 Claims, 17 Drawing Sheets

(51) Int. Cl.

| | | |
|---|---|---|
| *G06T 5/50* | (2006.01) | |
| *G06T 7/70* | (2017.01) | |
| *G06T 13/40* | (2011.01) | |
| *G06T 19/00* | (2011.01) | |
| *G06V 20/20* | (2022.01) | |
| *G06V 30/40* | (2022.01) | |
| *G09B 19/18* | (2006.01) | |
| *G06F 3/0482* | (2013.01) | |
| *G06F 3/0484* | (2022.01) | |

(52) U.S. Cl.
CPC ........... *G06T 7/70* (2017.01); *G06T 13/40* (2013.01); *G06T 19/006* (2013.01); *G06V 20/20* (2022.01); *G06V 30/40* (2022.01); *G06F 3/0482* (2013.01); *G06F 3/0484* (2013.01); *G06T 2200/04* (2013.01); *G06T 2207/20221* (2013.01)

(56) References Cited

U.S. PATENT DOCUMENTS

| | | | |
|---|---|---|---|
| 8,320,657 | B1 | 11/2012 | Burks et al. |
| 8,392,332 | B1 | 3/2013 | Oakes, III et al. |
| 8,433,127 | B1 | 4/2013 | Harpel et al. |
| 8,452,689 | B1 | 5/2013 | Medina, III |
| 8,538,124 | B1 | 9/2013 | Harpel et al. |
| 8,644,842 | B2 | 2/2014 | Arrasvuori et al. |
| 8,699,779 | B1 | 4/2014 | Prasad et al. |
| 8,708,227 | B1 | 4/2014 | Oakes, III et al. |
| 8,733,927 | B1 | 5/2014 | Lewis |
| 8,959,033 | B1 | 2/2015 | Oakes, III et al. |
| 8,977,571 | B1 | 3/2015 | Bueche, Jr. et al. |
| 9,092,674 | B2 | 7/2015 | Andrade et al. |
| 9,230,367 | B2 | 1/2016 | Stroila |
| 9,390,561 | B2 | 7/2016 | Brown et al. |
| 9,519,640 | B2 | 12/2016 | Perez et al. |
| 9,547,644 | B2 | 1/2017 | Cuthbert et al. |
| 9,547,938 | B2 | 1/2017 | Ramkumar et al. |
| 9,652,690 | B2 | 5/2017 | Eid et al. |
| 9,685,004 | B2 | 6/2017 | Wang et al. |
| 9,762,817 | B2 | 9/2017 | Osman |
| 9,779,392 | B1 | 10/2017 | Prasad et al. |
| 9,818,150 | B2 | 11/2017 | Rhoads et al. |
| 9,928,655 | B1 | 3/2018 | Alston |
| 9,971,768 | B2 | 5/2018 | Murthy et al. |
| 10,380,559 | B1 | 8/2019 | Oakes, III et al. |
| 10,607,230 | B2* | 3/2020 | Adams ............... G06Q 40/00 |
| 10,853,800 | B1* | 12/2020 | Meyer ............. G06Q 20/38215 |
| 10,855,914 | B1 | 12/2020 | Prasad et al. |
| 11,449,841 | B1* | 9/2022 | Srinivasarangan .... G06Q 20/30 |
| 11,875,314 | B1* | 1/2024 | Oakes, III ............ G06Q 20/325 |
| 2007/0015118 | A1 | 1/2007 | Nickell et al. |
| 2009/0313167 | A1 | 12/2009 | Dujari et al. |
| 2011/0170740 | A1 | 7/2011 | Coleman |
| 2012/0122570 | A1 | 5/2012 | Baronoff |
| 2012/0230577 | A1 | 9/2012 | Calman et al. |
| 2012/0330646 | A1 | 12/2012 | Andrade et al. |
| 2013/0204783 | A1 | 8/2013 | Klose et al. |
| 2013/0222670 | A1 | 8/2013 | Lin |
| 2013/0246094 | A1 | 9/2013 | Cruise |
| 2013/0250119 | A1 | 9/2013 | Xu |
| 2013/0317912 | A1 | 11/2013 | Bittner |
| 2014/0111542 | A1 | 4/2014 | Wan |
| 2014/0152677 | A1 | 6/2014 | Martinik |
| 2014/0172701 | A1 | 6/2014 | Pandhare |
| 2014/0188756 | A1 | 7/2014 | Ponnavaikko et al. |
| 2014/0298383 | A1 | 10/2014 | Jo et al. |
| 2015/0123966 | A1 | 5/2015 | Newman |
| 2016/0283824 | A1 | 9/2016 | Fukushima |
| 2017/0025088 | A1 | 1/2017 | Alon et al. |
| 2017/0161695 | A1 | 6/2017 | Carpenter et al. |
| 2017/0309108 | A1 | 10/2017 | Sadofsky et al. |
| 2017/0337352 | A1 | 11/2017 | Williams |
| 2018/0121988 | A1 | 5/2018 | Hiranandani et al. |
| 2018/0174195 | A1 | 6/2018 | Agarwal |
| 2018/0197199 | A1 | 7/2018 | Bartz Vieira de Oliveira |
| 2018/0204061 | A1 | 7/2018 | Antol et al. |
| 2019/0370549 | A1 | 12/2019 | Lai et al. |
| 2020/0042955 | A1* | 2/2020 | Widdows ........... G06Q 20/0425 |

OTHER PUBLICATIONS

Exploring the design of hybnd interfaces for augmented posters in public spaces Grubert, Jens; Grasset, Raphaël; Reitmayr, Gerhard Source: NordiCHI '12 Proceedings of the 7th Nordic Conference on Human-Computer Interaction: Making Sense Through Design pp. 238-246 , Oct. 14-17, 2012

Youtube Video—Augmented Reality eLearning Banking, Published on Apr. 3, 2018, https://www.youtube.com/watch?v=YOc3KnBFxp4, Located via Youtube.

A mobile augmented reality game design approach for on product advertising Nazri, Nur Intan Adhani M.; Rambli, Dayang Rohaya Awang; Tomi, Azfar Source: ACM International Conference Proceeding Series, Nov. 16-19, 2015, Nov. 16, 2015, ACE 2015—12th Advances in Computer Entertainment Technology Conference, Proceedings; ISBN-13: 9781450338523 +.

Augmented reality-based advertising strategies for paper leaflets Löchtenfeld, Markus; Daiber, Florian; Bohmer, Matthais, Gehring, Sven Source: UbiComp 2013 Adjunct—Adjunct Publication of the 2013 ACM Conference on Ubiquitous Computing, p. 1015-1021, 2013, UbiComp 2013 Adjunct—Adjunct Publication of the 2013 ACM Conference on Ubiquitous Computing;.

Augmented reality, smart codes and cloud computing for personalized interactive advertising on billboards López-Nores, Mártin; Blanco-Fernández, Yolanda; Pazos-Arias, José Juan; Gil-Solla, Alberto; Ramos-Cabrer, Manuel Source: Proceedings—10th International Workshop on Semantic and Social Media Adaptation and Personalization, SMAP 2015, p. 34-39, Dec. 31, 2015, Proceedings—10th International Workshop on Semantic and Social Media Adaptation and Personalization, SMAP 2015.

Physical posters as gateways to context aware services for mobile devices Rukzio, E.; Schmidt, A.; Hussmann, H. Source: Sixth IEEE Workshop on Mobile Computing Systems and Applications Conference Dates: Dec. 3, 2004 Print ISBN: 0-7695-2258-0 +.

Exploring the design of hybrid interfaces for augmented posters in public spaces Grubert, Jens; Grasset, Raphaël; Reitmayr, Gerhard Source: NordiCHI '12 Proceedings of the 7th Nordic Conference on Human-Computer Interaction: Making Sense Through Design pp. 238-246 , Oct. 14-17, 2012 +.

20 Best Free Augmented Reality Apps Maurya, Raj Kumar Source: PCQuest Feb. 14, 2017.

Youtube Video—Augmented Reality eLearning Banking, Published on Apr. 3, 2018, https://www.youtube.com/watch?v=YOc3KnBFxp4, Located via Youtube.

USPTO, Office Action relating to U.S. Appl. No. 16/145,365, dated Apr. 25, 2019.

USPTO, Office Action relating to U.S. Appl. No. 16/145,365, dated Jul. 9, 2021.

* cited by examiner

SIMULATOR FOR VALUE INSTRUMENT NEGOTIATION TRAINING

TECHNICAL FIELD

The present application relates to simulators for teaching and training purposes and, more particularly, to simulators for teaching and/or training related to negotiation of negotiable instruments.

BACKGROUND

Negotiation of negotiable instruments such as, for example the deposit of checks, may involve activity by human participants. For example, a customer may perform a remote deposit. In another example, a teller may handle in-person deposits. Such individuals may need to be trained to learn to perform such operations to eliminate or reduce human errors. For example, it can be costly and time consuming to decline a poorly submitted image of a check received by a bank server and to then request the submitter (e.g., the customer or the teller) to resubmit.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1B:
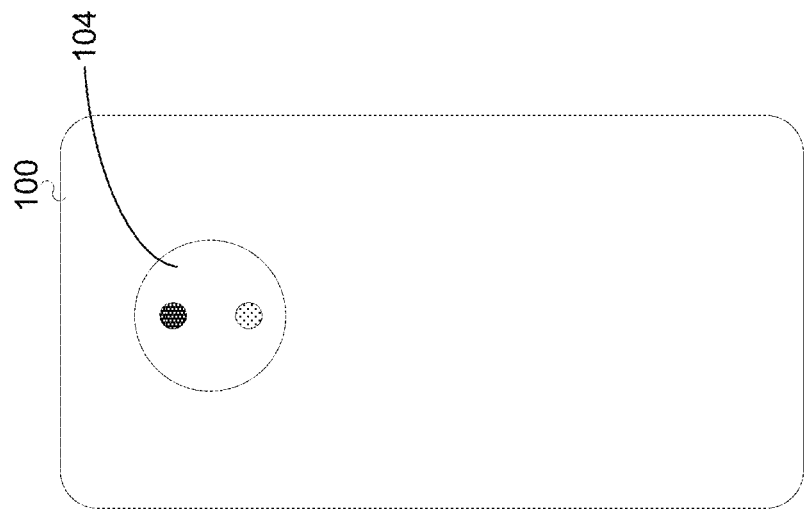
FIG. 1A and FIG. 1B show the front and back of a mobile device, respectively, of an example embodiment.

According to the subject matter of the present application, there may be provided a computer system. The computer system may include a processor, an input module coupled to the processor, an image capture module coupled to the processor, a display module coupled to the processor, and a memory module coupled to the processor. The memory module may store instructions that, when executed by the processor, cause the computer system to: capture, using the image capture module, an image of a portion of an environment including at least a portion of a piece of printed collateral, display an augmented reality version of the environment using the display module, and provide an indication of an outcome of a simulated negotiation of the negotiable instrument. It may be that displaying the augmented reality version of the environment includes: detecting the at least a portion of the piece of printed collateral in the image of the portion of the environment, replacing the at least a portion of the piece of printed collateral in the image of the portion of the environment with a corresponding portion of an image of a negotiable instrument to yield an image depicting the portion of the environment as including at least a portion of the negotiable instrument, and presenting, using the display module, the image depicting the portion of the environment as including the at least a portion of the negotiable instrument using the display module.

In this way, an augmented reality simulation for providing teaching and/or training related to negotiation of negotiable instruments may be provided. For example, the simulation may provide teaching and/or training related to deposit of a negotiable instrument such as, for example, a check or money order.

In some implementations, the memory module may store further instructions that, when executed by the processor further cause the computer system to: capture, using the image capture module, one or more further images of portions of the environment; and detect that one of the one or more further images of portions of the environment includes the entirety of the printed collateral in a defined position within that further image. It may be that the indication of the outcome of the simulated negotiation of the negotiable instrument is presented responsive to the detection that the one of the one or more further images of portions of the environment includes the entirety of the printed collateral in the defined position. Presenting the indication of the outcome of the simulated negotiation of the negotiable instrument may include presenting, using the display module, a user interface simulating a remote deposit of the negotiable instrument. In some such implementations, the memory module may store further instructions that, when executed by the processor further cause the computer system to: present a user interface for configuring the remote deposit of the negotiable instrument; receive, using the input module, input for configuring the remote deposit of the negotiable instrument; and determine whether the received input matches values related to the negotiable instrument. Presenting the user interface simulating the remote deposit of the negotiable instrument may include providing an indication as to whether the remote deposit is successful based on whether the received input matches the values related to the negotiable instrument.

In some implementations, the negotiable instrument may include one or more indicia of potential fraud. In some such implementations, the memory module may store further instructions that, when executed by the processor further cause the computer system to: present, using the display module, a first option to accept the negotiable instrument for deposit and a second option to not accept the negotiable instrument for deposit; and receive, via the input module, input selecting one of the first and second options. Presenting the indication of the outcome of the simulated negotiation of the negotiable instrument may include presenting an indication as to whether accepting the negotiable instrument for negotiation would further a fraud.

In some implementations, displaying the augmented reality version of the environment may further include: compositing one or more images of portions of the environment captured using the image capture module with an animation of a person attempting to negotiate the negotiable instrument.

In some implementations, the memory module may store further instructions that, when executed by the processor further cause the computer system to: responsive to input received via the input module, present, using the display module, information related to a simulated account. It may be that the negotiation of the negotiable instrument includes a possible deposit into the simulated account.

The negotiable instrument may, for example, be a check, a money order, or a draft.

According to the subject matter of the present application, there may be provided a computer-implemented method. The method may include capturing, using an image capture module, an image of a portion of an environment including at least a portion of a piece of printed collateral; displaying an augmented reality version of the environment; and providing an indication of an outcome of a simulated negotiation of the negotiable instrument. It may be that displaying the augmented reality version of the environment includes: detecting the at least a portion of the piece of printed collateral in the image of the portion of the environment, replacing the at least a portion of the piece of printed collateral in the image of the portion of the environment with a corresponding portion of an image of a negotiable instrument to yield an image depicting the portion of the environment as including at least a portion of the negotiable instrument, and presenting, using a display module, the image depicting the portion of the environment as including the at least a portion of the negotiable instrument using the display module In some implementations, the method may further include: capturing, using the image capture module, one or more further images of portions of the environment; and detecting that one of the one or more further images of portions of the environment includes the entirety of the printed collateral in a defined position within that further image. It may be that the indication of the outcome of the simulated negotiation of the negotiable instrument is presented responsive to the detection that the one of the one or more further images of portions of the environment includes the entirety of the printed collateral in the defined position. Presenting the indication of the outcome of the simulated negotiation of the negotiable instrument may include presenting, using the display module, a user interface simulating a remote deposit of the negotiable instrument. In some such implementations, the method may further include presenting a user interface for configuring the remote deposit of the negotiable instrument; receiving, using an input module, input for configuring the remote deposit of the negotiable instrument; and determining whether the received input matches values related to the negotiable instrument. Presenting the user interface simulating the remote deposit of the negotiable instrument may include providing an indication as to whether the remote deposit is successful based on whether the received input matches the values related to the negotiable instrument.

In some implementations, the negotiable instrument may include one or more indicia of potential fraud. In some such implementations, the method may further include: presenting a first option to accept the negotiable instrument for deposit and a second option to not accept the negotiable instrument for deposit; and receiving, via an input module, input selecting one of the first and second options. Presenting the indication of the outcome of the simulated negotiation of the negotiable instrument may include presenting an indication as to whether accepting the negotiable instrument for negotiation would further a fraud.

In some implementations, displaying the augmented reality version of the environment may further include: compositing one or more images of portions of the environment captured using the image capture module with an animation of a person attempting to negotiate the negotiable instrument.

In some implementations, the method may further include: responsive to input received via an input module, presenting information related to a simulated account, the negotiation of the negotiable instrument including a possible deposit into the simulated account.

The negotiable instrument may be a check, a money order, or a draft.

According to the subject matter of the present application, there may be provided a non-transitory computer-readable storage medium storing instructions that, when executed by a processor of a computing device, cause the computing device to perform the above-discussed method.

According to the subject matter of the present application, there may be provided a non-transitory computer-readable storage medium storing instructions that, when executed by a processor of a computing device, cause the computing device to: capture, using an image capture module, an image of a portion of an environment including at least a portion of a piece of printed collateral; display an augmented reality version of the environment using a display module; and provide an indication of an outcome of a simulated negotiation of the negotiable instrument. It may be that displaying the augmented reality version of the environment includes: detecting the at least a portion of the piece of printed collateral in the image of the portion of the environment, replacing the at least a portion of the piece of printed collateral in the image of the portion of the environment with a corresponding portion of an image of a negotiable instrument to yield an image depicting the portion of the environment as including at least a portion of the negotiable instrument, and presenting, using the display module, the image depicting the portion of the environment as including the at least a portion of the negotiable instrument using the display module.

In some implementations, the medium may store further instructions that, when executed by a processor of a computing device, further cause the computing device to: capture, using the image capture module, one or more further images of portions of the environment; and detect that one of the one or more further images of portions of the environment includes the entirety of the printed collateral in a defined position within that further image. It may be that the indication of the outcome of the simulated negotiation of the negotiable instrument is presented responsive to the detection that the one of the one or more further images of portions of the environment includes the entirety of the printed collateral in the defined position. Presenting the indication of the outcome of the simulated negotiation of the negotiable instrument may include presenting, using the display module, a user interface simulating a remote deposit of the negotiable instrument.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1A:
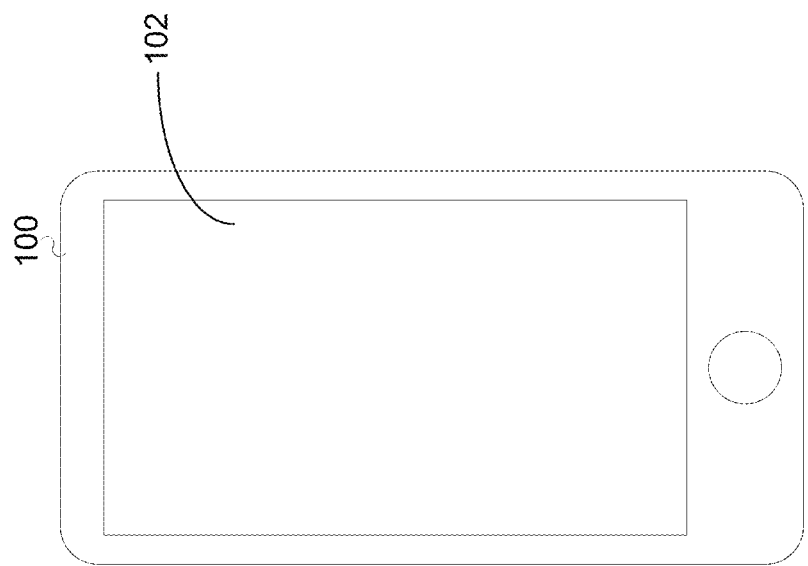

FIG. 1A and FIG. 1B show the front and back of a mobile computing device 100, respectively.

As further described below, the mobile computing device 100 is adapted to provide a simulation for teaching and training related to deposit of negotiable instruments. Put another way, the mobile computing device 100 acts a simulator for teaching and training related to deposit of negotiable instruments.

The mobile computing device 100 is a computer system. The mobile computing device 100 may, in some embodiments, be a smartphone as shown in FIGS. 1A and 1B. In other embodiments, the mobile computing device 100 may be another form of mobile computing device such as, for example, a tablet.

Referring now to FIG. 1A, the front of the mobile computing device 100 includes a display 102. The display 102 is a module of the mobile computing device 100. The display 102 is for presenting graphics. The display 102 may be, for example, a liquid crystal display (LCD). In addition to being an output device, the display 102 may also be an input device. For example, the display 102 may allow touch input to be provided to the mobile computing device 100. In other words, the display 102 may be a touch sensitive display module. In a particular example, the display 102 may be a capacitive touch screen.

Referring to FIG. 1B, the rear of the mobile computing device 100 includes a camera 104. The camera 104 is or is a component of an image capture module. The camera 104 is for capturing images of the environment of the mobile computing device 100. The camera 104 may incorporate a digital image sensor such as, for example, a charge coupled device (CCD) or a complementary metal-oxide-semiconductor (CMOS) image sensor.

Figure 2:
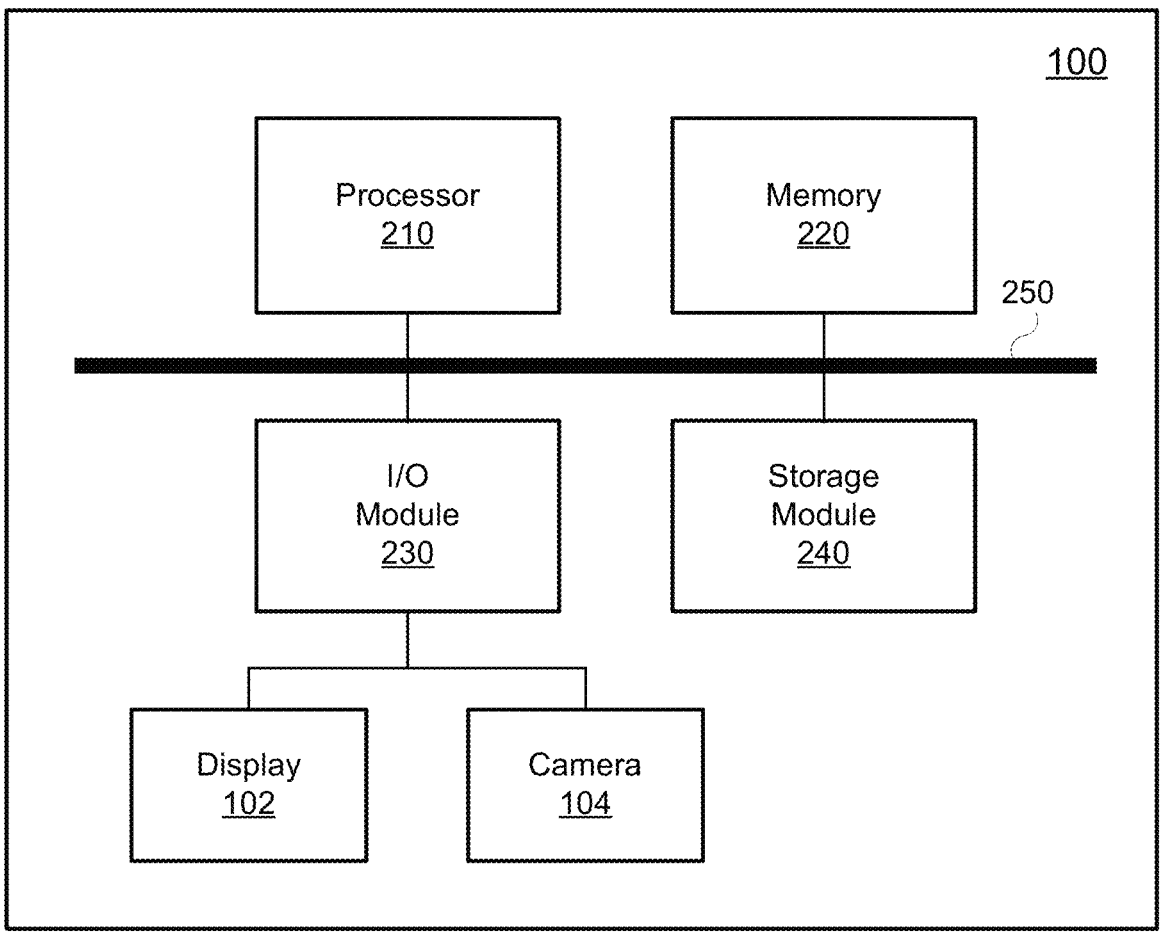
FIG. 2 is a high-level schematic diagram of the mobile device of FIGS. 1A and 1B.

FIG. 2 is a high-level schematic diagram of the mobile computing device 100.

The mobile computing device 100 includes a variety of modules. For example, as illustrated, the mobile computing device 100 may include a processor 210, a memory 220, an I/O module 230, and/or a storage module 240. As illustrated, the foregoing example modules of the mobile computing device 100 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are each computer-readable storage media and may each be considered non-transitory computer-readable storage medium. A computer-readable medium may be organized using a file system such as may be administered by an operating system governing overall operation of the mobile computing device 100.

The I/O module 230 is both an input module and an output module. The I/O module 230 allows the mobile computing device 100 to receive input from and/or to provide output to components of the mobile computing device 100. For example, the I/O module 230 may, as shown, allow the mobile computing device 100 to receive input from and/or provide output to the display 102 and/or the camera 104.

The storage module 240 allows data to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in/from a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN).

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
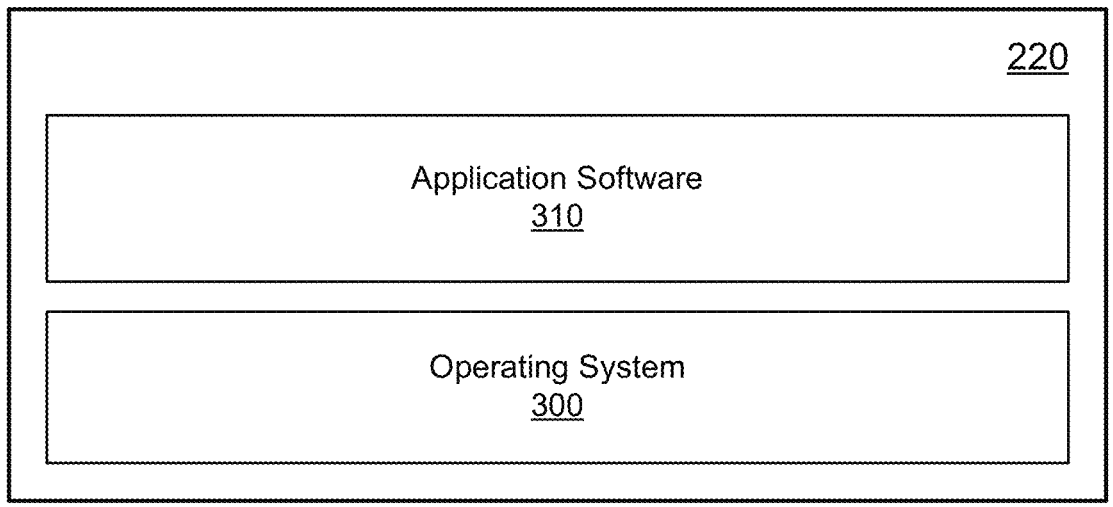
FIG. 3 shows a simplified organization of software components stored in a memory of the mobile device of FIGS. 1A and 1B.

FIG. 3 depicts a simplified organization of software components stored in the memory 220 of the mobile computing device 100. As illustrated, these software components include an operating system 300 and an application software 310.

The operating system 300 is software. The operating system 300 allows the application software 310 to access the processor 210 (FIG. 2), the memory 220, the I/O module 230, and the storage module 240 of the mobile computing device 100. The operating system 300 may be, for example, Google™ Android™, Apple™ iOS™, UNIX™, Linux™, Microsoft™ Windows™, Apple OSX™ or the like.

The application software 310 adapts the mobile computing device 100, in combination with the operating system 300, to operate as a simulator for teaching and training related to deposit of negotiable instruments. Where the mobile computing device 100 is a smartphone or tablet, the application software 310 may itself be or may be a part of a smartphone or tablet application or "app".

The operation of the mobile computing device 100 will now be described with reference to the flowchart of FIG. 4 which illustrates a method 400 for providing an augmented reality based simulated related to negotiation of a negotiable instrument. In performing the method 400, operations starting from an operation 402 and continuing onward are performed by the processor 210 of the mobile computing device 100 executing software such as, for example, a suitable instance of the application software 310 (FIG. 3).

At the operation 402, an image of a portion of an environment—e.g., the environment in which the mobile computing device 100 is located—is captured by the mobile computing device. The image may be captured using an image capture module such as, for example, the camera 104.

Following the operation 402, an operation 404 is next.

At the operation 404 an augmented reality version of the above-mentioned environment is displayed by the mobile computing device 100. The augmented reality presentation may, for example, be displayed using a display module such as, for example, the display 102.

Augmented reality is a specialized form of virtual reality in which graphic objects in a virtual-reality environment are related to objects in a real-world scene or environment and are presented in real-time as that real-world environment is captured using an image capture module.

As further described below, the augmented reality presentation provided at the operation 404 includes a presentation of a simulated negotiable instrument. For example, the augmented reality presentation may show a negotiable instrument such as, for example, a check, a money order, a draft (e.g., a bank draft), a warrant, or the like.

The presentation of the augmented reality version of the environment shows a portion of the environment. It may, for example, be of the portion of the environment included in the image captured at the operation 402. In a particular example, the augmented reality version of that portion of the environment may be generated and provided by the mobile computing device 100 by modifying the captured image to include a simulated negotiable instrument and presenting the resulting modified image using the display 102. Modifying the captured image may include compositing the captured image with an image of a negotiable instrument.

More broadly, further images of the portions of the environment may be captured using the camera 104 (e.g., over time). Images captured using the camera 104 may then also be modified to show a negotiable instrument. For example, such a further image may also be composited with the image of the negotiable instrument or portions thereof such as, for example, to show portions of the negotiable instrument such as would be visible in the portion of the environment being captured. These modified images may be generated and presented instantaneously or near-instantaneously after capture of the corresponding captured image thereby allowing the portion of the environment in the captured image to be rendered in augmented reality at a given instant (or soon thereafter). Such images may, as generated, be displayed using the display 102. Conveniently, in this way, an augmented reality presentation responsive to repositioning of the mobile computing device 100 relative to its environment may be provided. Notably, providing a responsive augmented reality display with minimal lag requires that such a capture-composition-display loop operate in real time or near-real time.

Figure 5:
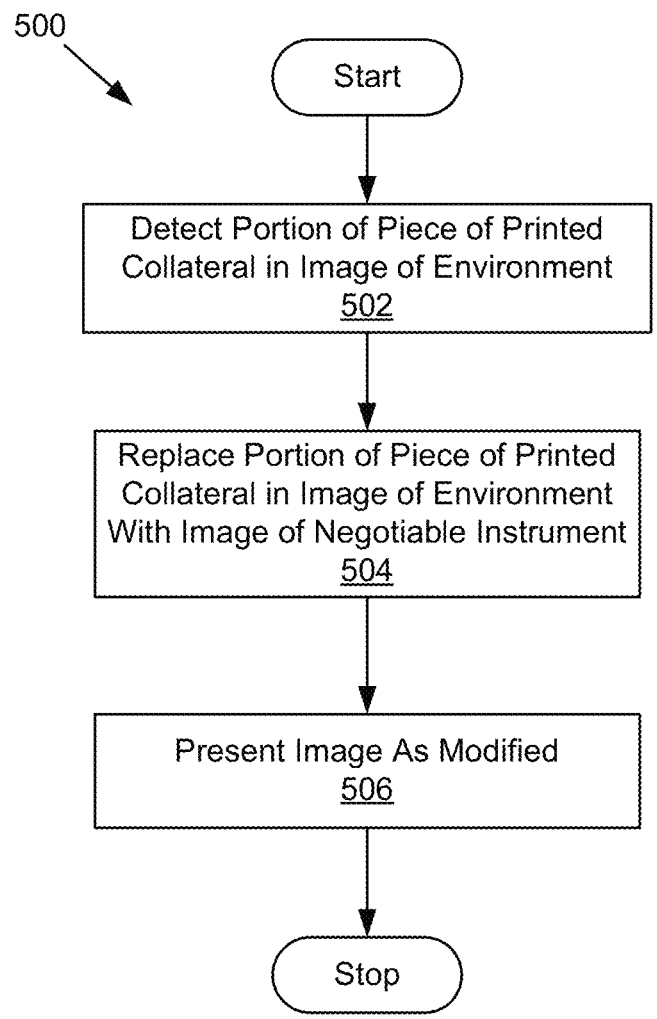
FIG. 5 is a flowchart showing operations performed by the mobile device of FIGS. 1A and 1B in displaying an augmented reality presentation including a simulated negotiable instrument.

An example manner of displaying an augmented reality of the environment will now be described with reference to the flowchart of FIG. 5 which illustrates a method 500. In performing the method 500, operations starting from an operation 502 and continuing onward are performed by the processor 210 (FIG. 2) of the mobile computing device 100 executing software such as, for example, a suitable instance of the application software 310 (FIG. 3).

By way of overview, the method 500 involves detection of a piece of printed collateral in a captured image of a portion of an environment. The mobile computing device 100 then replaces the piece of printed collateral (or a portion thereof) in the image of the portion of the environment with an image of a negotiable image (or a portion thereof). The resulting modified image is displayed by the mobile computing device 100 thereby providing an augmented reality simulation in which the piece of printed collateral is replaced by a simulated negotiable instrument.

At the operation 502, the mobile computing device 100 detects that an image of the portion of an environment includes a piece of a printed collateral or at least a portion thereof.

The image of the portion of the environment may be an image of a portion of the environment in which the mobile computing device 100 is located. For example, the image may be the image captured at the operation 402 (FIG. 4).

The piece of printed collateral may take a variety of forms. For example, the printed collateral may be a pamphlet, a handbill, a printed form, or the like.

Figure 6:
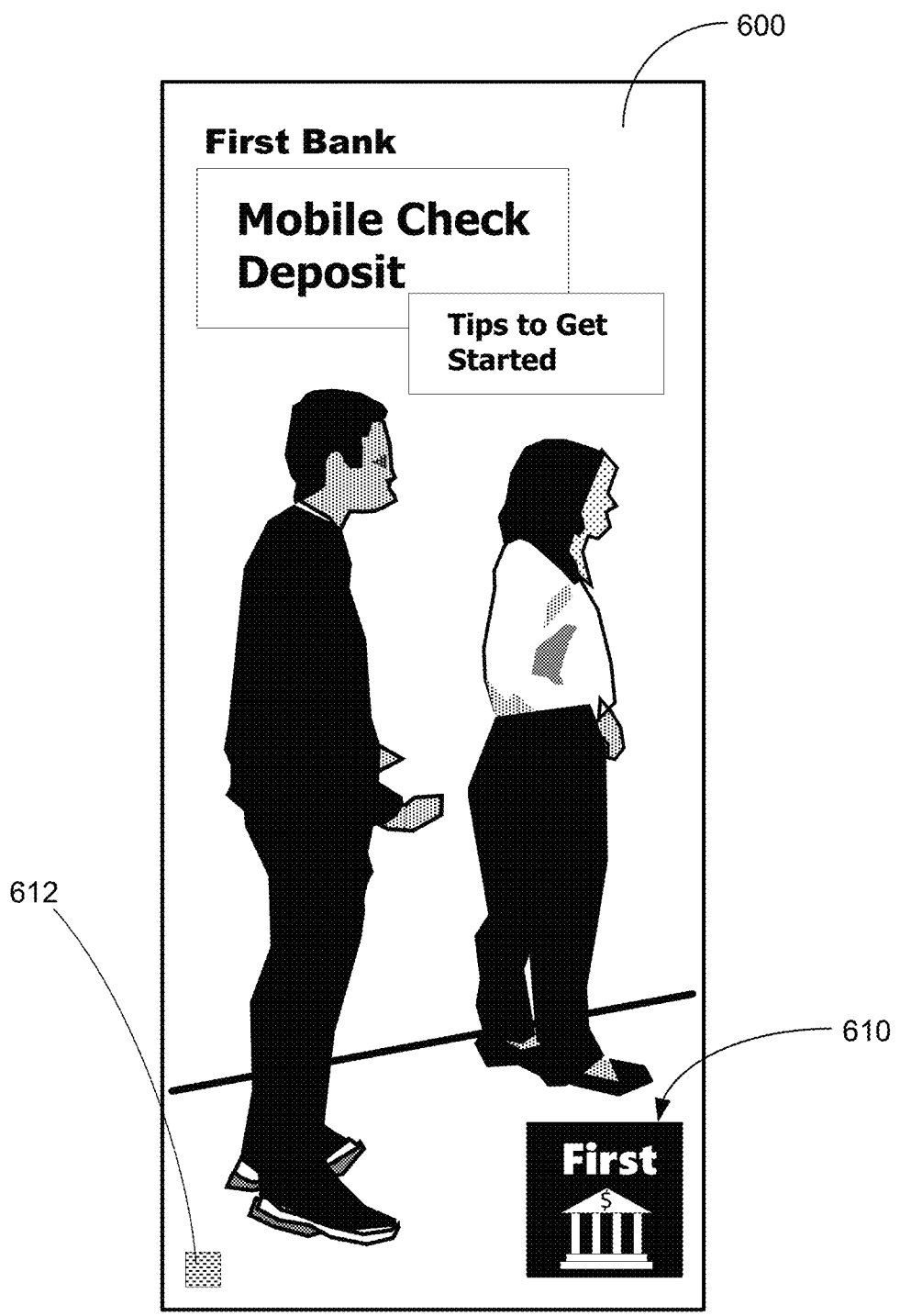
FIG. 6 shows an example piece of printed collateral such as may be employed in providing an augmented reality presentation including a simulated negotiable instrument.

An example piece of printed collateral is shown in FIG. 6. As shown, the example printed collateral 600 is a brochure and, in particular, a brochure providing information related to mobile check deposit. It may be that the example printed collateral includes information related to how to deposit a check using mobile check deposit (which is also known as remote deposit capture) as suggested by the illustration on the cover of the example printed collateral 600.

The example printed collateral 600 may include information about how to obtain and/or install software—e.g., obtain and/or install the application software 310 (FIG. 3)—in order to configure a given computing device to act as a simulator for providing teaching and/or training related to negotiable instruments. In a particular example, the example printed collateral 600 may include information about how to obtain or install an app on a mobile device (e.g., the mobile computing device 100) in order to adapt that mobile device to act as a simulator. For example, where the application software 310 is a mobile app, the example printed collateral 600 may include information about installing an app such as may, for example, provide mobile check deposit training including an augmented reality simulation of one or more checks, the deposit of which may be simulated by the mobile device as configured by the mobile app. As an example, the information related to obtaining the software provided in the example printed collateral 600 may include one or more of an installation link for an app, an identification of the app, and/or a machine-readable indicium (e.g., a QR (quick response) barcode) encoding an installation link for the app.

A piece of printed collateral may be positioned in various places in an environment. For example, a trainee using the simulator could place a piece of printed collateral on a table or other horizontal surface.

Detection of the image of the printed collateral or portion thereof in the image may take a variety of forms and may be performed in a variety of manners. Examples of detecting the printed collateral or portion thereof in an image of a portion of the environment will now be discussed with reference to FIG. 6.

As shown in FIG. 6, the example printed collateral 600 includes a logo 610. It may be that the logo 610 is a known image that is expected to included on the printed collateral. Accordingly, it may be that analysis of an image of a portion of an environment recognizes the presence of at least a portion of a particular piece of printed collateral by detecting a logo like the logo 610 in the image of the portion of the environment.

Additionally or alternatively, the detection of the piece of printed collateral or portion thereof in the image of the portion of the environment may rely on a machine interpretable indicium. For example, the example printed collateral includes a machine-interpretable indicium 612. The machine-interpretable indicium 612 may, for example, be a barcode, a 2D barcode such as a QR code, a data-matrix code or similar, or some other indicium capable of being interpreted by a computing device based on a captured image. Such an indicium may, akin to a logo, be expected to be included on a piece of printed collateral. In another example, such an indicium may, for example, include a unique identifier allowing the piece of printed collateral to be recognized.

The above examples of detection of a piece of printed collateral or portion thereof in an image of a portion of an environment are, as mentioned above, by way of example only. Other techniques, whether existing or developed in the future, may equally be applied at the operation 502 as a part of an implementation of the subject matter of the present application. In a particular example, it may be that one or more techniques discussed above may be applied in combination. For example, it may be that where a given piece of printed collateral includes both a logo and a machine-readable indicium (e.g., the example printed collateral 600), detection can operate based on detecting the presence of either of the logo and/or the machine-interpretable indicium in an image of a portion of an environment. Detection that can flexibly operate based on the presence of either a logo and a machine-interpretable indicium may be more robust than if only one or the other is considered. For example, it may be that where both are considered, then the presence of a portion of a piece of printed collateral in a captured image of a portion of an environment may be detected even if only one or the other is included in the captured portion of the piece of printed collateral. In some embodiments, pieces of printed collateral may include more than one logo and/or more than one machine-interpretable indicium to similar ends and, potentially, to further advantage.

Returning to FIG. 5, following the operation 502, an operation 504 is next.

At the operation 504, the mobile computing device 100 causes the piece of printed collateral (or portion thereof) detected in the image of the portion of the environment at the operation 502 to be replaced with an image of a negotiable instrument. In particular, the portion of the piece of printed collateral included in the image of the portion of the environment may be replaced with a corresponding portion of an image of a negotiable instrument.

Negotiable images, and consequently images, thereof may take a variety of forms. For example, a negotiable instrument may be a bill of exchange such as, for example, a check. Examples of negotiable instruments also include money orders, drafts (e.g., bank drafts), and warrants.

Figure 7:
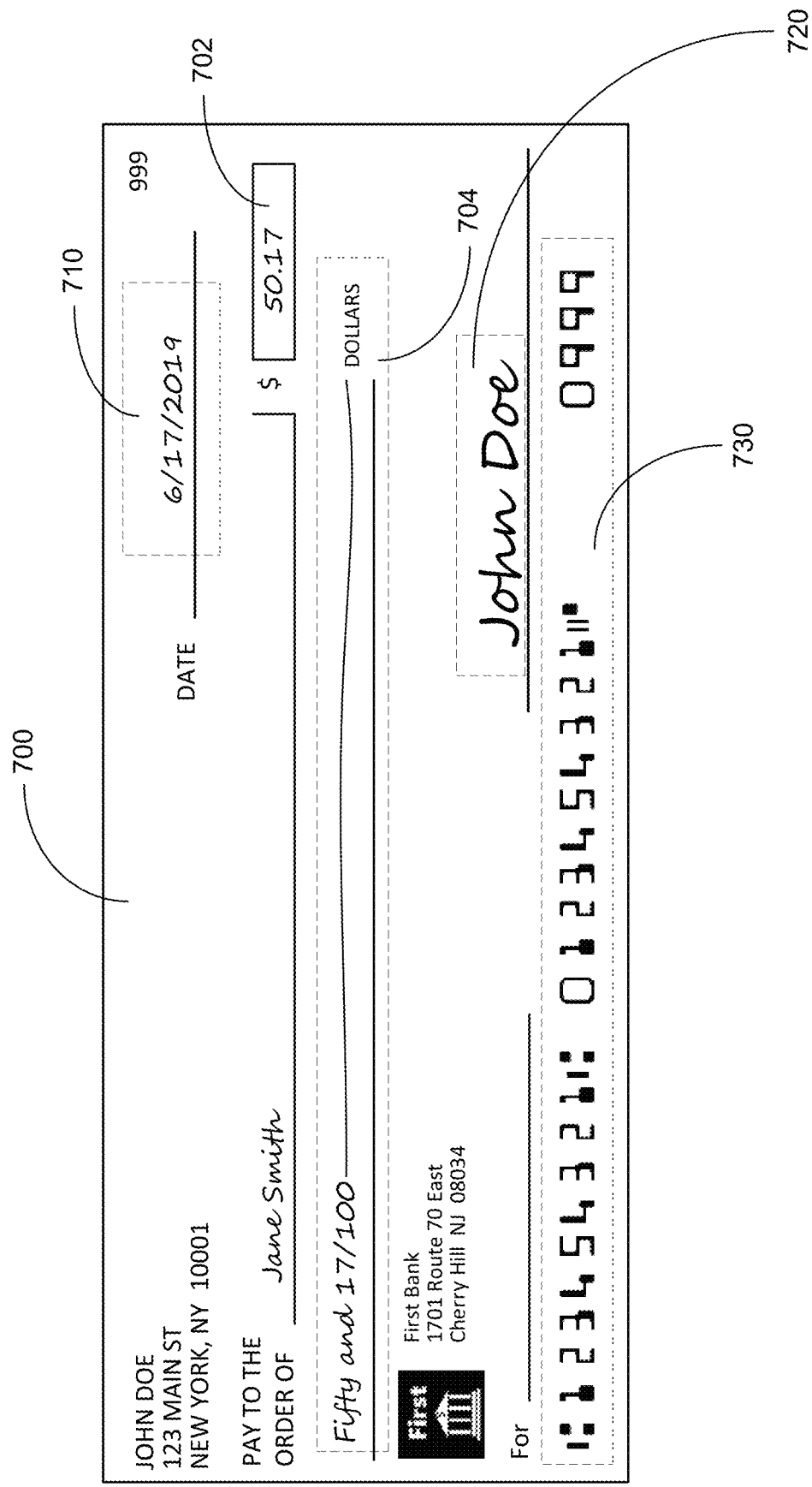
FIG. 7 shows an example negotiable instrument.

An image of an example negotiable instrument 700 is provided in FIG. 7.

As illustrated, the example negotiable instrument 700 is a check and, in particular, a U.S. check. The example negotiable instrument 700 includes a variety of elements. These elements are standardized according to various standards documents produced by the Accredited Standards Committee X9, Incorporation, and registered with the American National Standards Institute (ANSI) including ASC X9 TR2, "Understanding, Designing and Producing Checks"; ASC X9 TR 6, "Guide to Quality MICR Printing and Evaluation", ASC X9 TR 8, "Check Security"; ASC X9 TR 33, "Check Image Quality Assurance—Standards and Processes"; and ASC X9 TR 100-2013 "Organization of Check-related Payments Standards", the contents of each which is herein incorporated by reference in its entirety. Checks from other jurisdictions may comply with similar standards such as may be promulgated by various national standards organizations and/or industry groups. For example, Canadian cheques may include elements standardized according to standards published by Payments Canada (formerly known as the Canadian Payments Association) such as, for example, Standard 006 entitled "Specifications for MICR-Encoded Payment Items", 2017 (available, for example, from the organization's website, www.payments.ca), the contents of which are herein incorporated by reference in their entirety.

As illustrated, the example negotiable instrument 700 includes a variety of elements including a convenience amount 702, a legal amount 704, a date 710, a signature 720, and a MICR line 730.

The example negotiable instrument 700 includes two amount fields. The convenience amount 702 provides an amount of the example negotiable instrument 700 ($50.17) using numerals. The legal amount 704 provides the amount of the example negotiable instrument 700 using words.

The MICR line 730 provides information about the example negotiable instrument 700 in machine-readable format using magnetic ink character recognition (MICR) characters. The characters of the MICR line 730 may be recognized using a magnetic or an optical scanner. The MICR line 730 provides information in a defined format. In particular, the characters of the MICR line 730 are divided into fields, each providing particular information about the check.

The MICR line 730 includes fields including a routing number (found between a pair of "transit symbols") that is followed by an account number (which is terminated by an "on-us" symbol). The routing number provides a nine-digit ABA routing number (ABA RTN). The routing number provides information related to routing of checks in the US Federal Reserve system including allowing the institution on which the example negotiable instrument 700 is drawn (the "drawee institution") to be identified. The account number identifies an account at the financial institution corresponding to the routing number.

The example negotiable instrument 700 also includes other fields such as, for example, addresses of the drawee and the drawer, a "for" line (also known as a memo line), as well as the date 710 and the signature 720 mentioned above. These provide additional information that may allow the check to be understood or interpreted. For example, the date 710 may be considered to determine whether a check is post-dated or stale-dated. In another example, the signature 720 may be considered or verified to consider whether the check is valid (e.g., has it been signed by the payor).

Returning to consideration of FIG. 5 and, in particular, the operation 504, example manners of replacing a piece of printed collateral (or portion thereof) in an image will now be discussed.

Notably, replacement of a piece of a printed collateral (or portion thereof) in an image of a portion of an environment may involve detection of the extent of the printed collateral in the image. In this way, a portion of the image of the portion of the environment that will be replaced with a corresponding portion of a negotiable instrument may be identified. Such extents may be determined a variety of manners. Example manners of determining the extents of a piece of printed collateral in an image of a portion of an environment will now be discussed with reference to FIG. 6.

Where printed collateral includes a logo such as, for example, the logo 610, the piece of collateral may be of a defined size such that the extent of a printed collateral in an image may be determined based on the relative size of the logo in an image of a portion of an environment. More particularly, it may be that the extents of the printed collateral or the portion thereof in the captured image can be computed on a pixel basis based on the size in pixels of a logo in a printed collateral. Additionally or alternatively, it may be that once such a logo is recognized in a printed collateral, the extents thereof can be determined based on the logo being in a defined position on printed collateral where it appears and also of a defined size relative to the size of a given piece of printed collateral. Additionally or alternatively, the background of a printed collateral (e.g., its colour) may be selected to contrast with the environment so as to allow replacement of the printed collateral (or the portion thereof that was captured) in an image of a portion of the environment once the presence of a printed collateral in the captured image is detected based on the presence of a logo.

In another example, where a piece of printed collateral includes a machine-interpretable indicium such as, for example, the machine-interpretable indicium 612, the indicium may, akin to a logo, be placed in a defined position on a piece of collateral and/or may be of a defined size. Conveniently, this may allow the extents of the piece of printed collateral (or extents) thereof to be detected in an image in manners similar to with a logo having a defined size and/or position as discussed above. For example, based on a position of a machine-readable indicium in the image of a portion of an environment, edges of at least a portion of a piece of printed collateral including the machine-readable indicium may be identified. For example, the machine-interpretable indicium 612 may directly encode information including, potentially, information as may assist in extraction of an image of the at least a portion of a piece of printed collateral from an image of a portion of an environment such as, for example, information about the background colour of the printed collateral, the size of the printed collateral, the position of a machine-interpretable indicium on the particular piece of printed collateral, the edges of the particular piece of printed collateral, etc.

The above examples of determining the extents of a piece of printed collateral in an image of a portion of an environment are, however, by way of example only. Other techniques, whether existing or developed in the future, may equally be applied at the operation 502 as a part of an implementation of the subject matter of the present application. In a particular example, it may be that one or more techniques discussed above may be applied in combination. For example, where a piece of printed collateral includes both a known logo and a machine-interpretable indicium (e.g., akin to the example printed collateral 600), the size and/or position of each may be considered in identifying extents of piece of printed collateral featured in an image of a portion of an environment. Conveniently, in this way, accuracy of the detection may be improved as compared to if only one or the other is considered. Additionally or alternatively, detection of the extents of a printed collateral in such images that can flexibly operate based on the presence of one or both of a logo and a machine-interpretable indicium may be more robust than if only one or the other is considered. For example, it may be that where both are considered, then the presence of a portion of the piece of printed collateral in a captured image of a portion of an environment may be detected even if only one or the other of the logo and the machine-interpretable indicium is included in the captured portion of the placard. In some embodiments, pieces of printed collateral may include more than one logo and/or more than one machine-interpretable indicium to similar ends and, potentially, to further advantage.

However identified, once the extents of a piece of printed collateral or portions thereof in a given image of a portion of an environment are identified, the piece of printed collateral (or at least a portion thereof) is replaced in the image of environment with a corresponding portion of an image of a negotiable instrument. For example, it may be that once the extents of the piece of printed collateral are identified in a given image of a portion of an environment, that portion of the image is replaced with a correspondingly sized and shaped portion of an image of a negotiable instrument.

Following the replacement of the detected piece of printed collateral (or portion thereof) in the image of the portion of the environment at the operation 504 by a corresponding portion of an image of a negotiable instrument, an operation 506 is next.

At the operation 506, the modified image of the portion of the environment in which the piece of printed collateral has been replaced by the negotiable instrument is presented by the mobile computing device 100. In particular, the image depicting the portion of the environment as including the negotiable instrument (or portion thereof as the case may be) may be presented such, as for example, by displaying it using a display module such as, for example, the display 102 of the mobile computing device 100.

Figure 8:
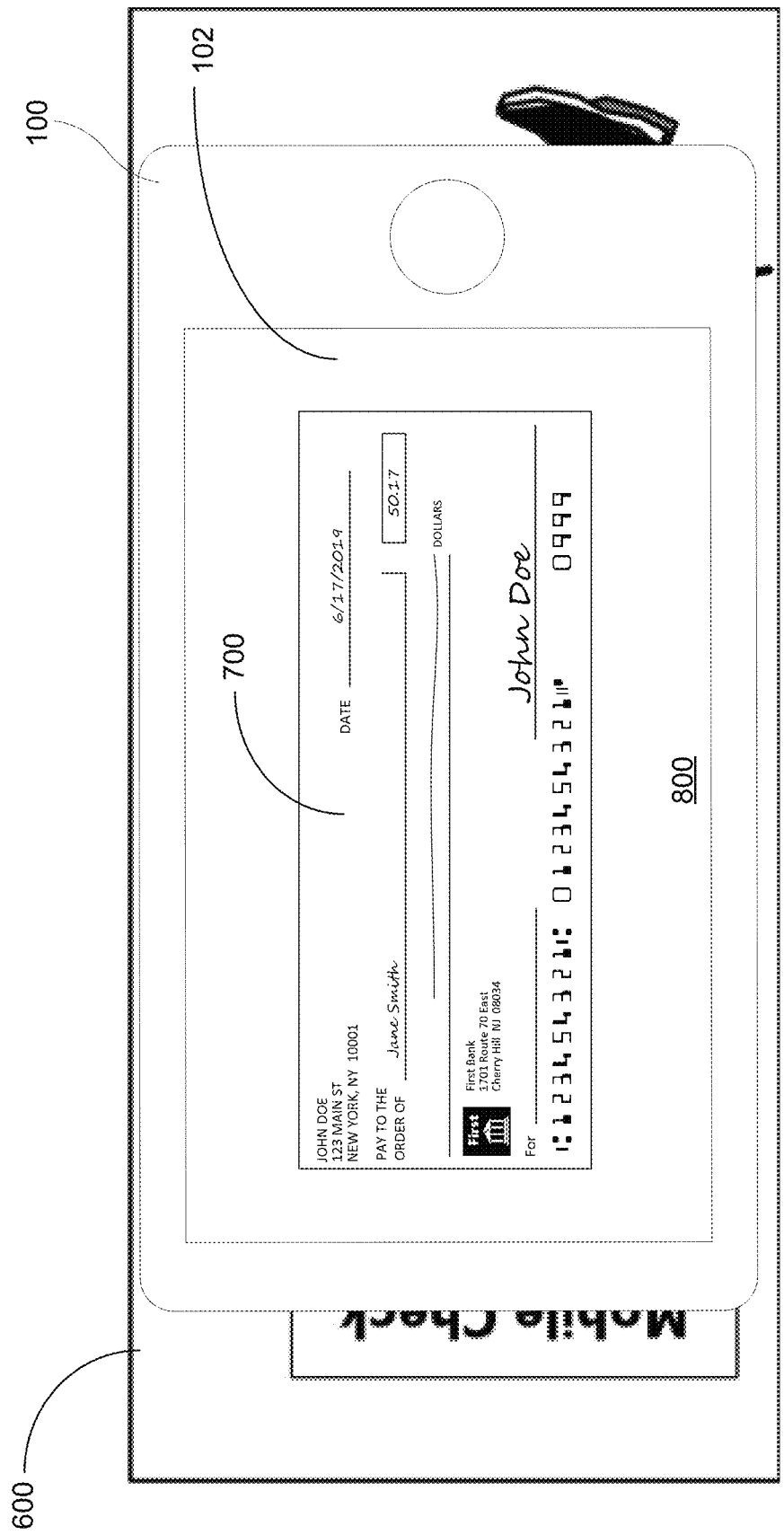
FIG. 8 illustrates use of the example piece of printed collateral of FIG. 6 with the mobile device of FIGS. 1A and 1B in providing an augmented reality presentation that includes a simulation of the example negotiable instrument of FIG. 7.

An example of a presentation of a modified image of the portion of the environment in which the example printed collateral 600 has been replaced by the example negotiable instrument 700 is provided in FIG. 8. As illustrated, the display 102 of the mobile computing device 100 provides a presentation 800 including the example negotiable instrument 700. Meanwhile, the rear of the mobile computing device 100, which includes the camera 104, is directed at the example printed collateral 600 so as to allow the mobile computing device 100 to capture an image of a portion of the surrounding environment including the example printed collateral 600. The printed collateral 600 has then been replaced by the mobile computing device 100 in the image with the example negotiable instrument 700 to yield the view presented in the presentation 800.

Figure 4:
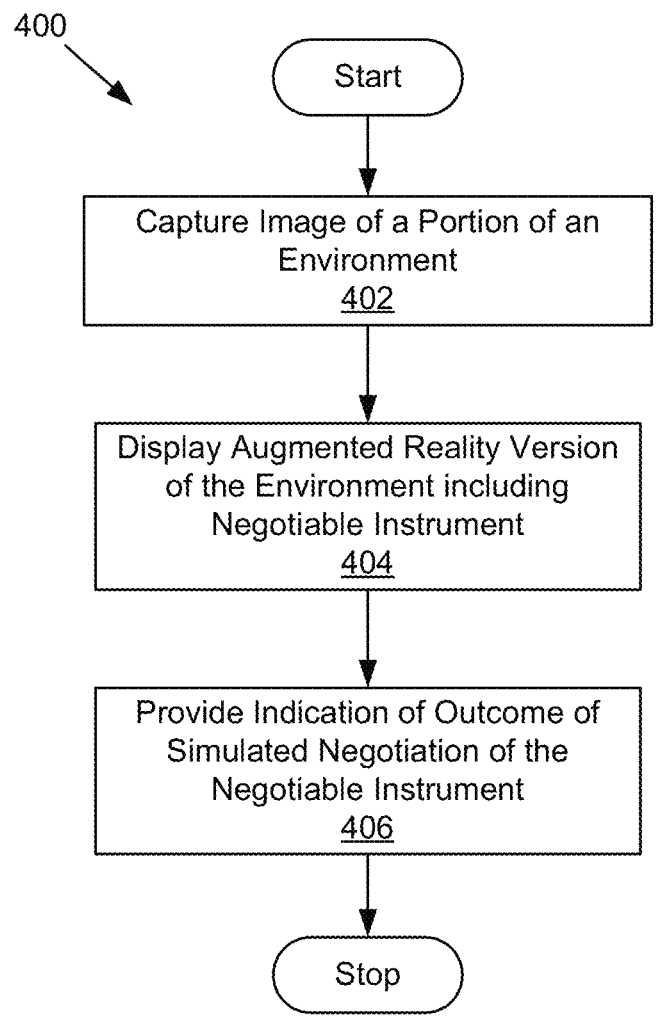
FIG. 4 is a flowchart showing example operations performed by the mobile device of FIGS. 1A and 1B in acting as a simulator for teaching and/or training related to negotiation of negotiable instruments.

The discussion now returns to consideration of the method 400 with reference to FIG. 4.

In particular, the discussion now returns to consideration of the operation 404 at which the augmented reality version of the environment including the negotiable instrument is displayed. As mentioned above, such a display may be provided in a variety of manners, including, potentially, according to the method 500 (FIG. 5).

Following the operation 404, an operation 406 is next.

At the operation 406, an indication of an outcome of a simulated negotiation of the negotiable instrument depicted in the augmented reality version of the environment is provided.

Such a simulated negotiation may take a variety of forms depending on the nature of the teaching and/or training being provided in a given instance. Example training will now be discussed with reference to various examples.

In a first example of training related to negotiable instrument negotiation, training may be provided related to mobile deposit/remote deposit capture.

In such a scenario, user interface may be provided related to remote deposit capture.

Figure 9:
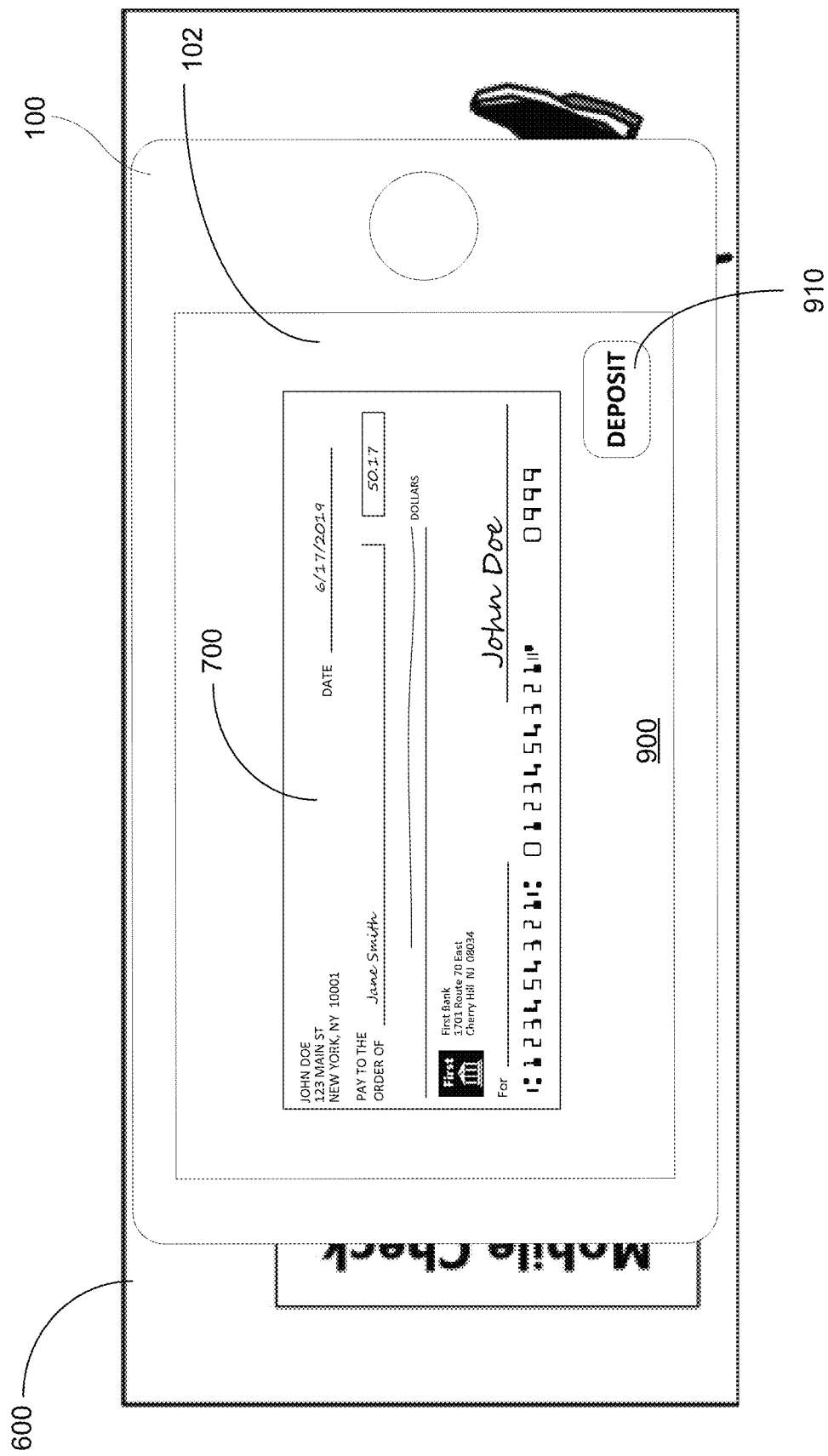
FIG. 9 shows a variation of the augmented reality presentation of FIG. 8 including user interface for simulating remote deposit of the simulated negotiable instrument.

For example, it may be that augmented reality presentation discussed above (e.g., the presentation displayed at the operation 404 (FIG. 4)) may also include screen elements simulating a remote deposit capture application. An example of such a screen element is shown in FIG. 9. FIG. 9 shows the display 102 of the mobile computing device 100 providing a presentation 900 similar to the presentation 800 (FIG. 8). Notably, the presentation 900 may be provided in similar manners to the presentation 800; however, the presentation 900 includes additional screen elements related to remote deposit capture. For example, the presentation 900 includes a control 910 as shown. As illustrated, the control 910 is a button labeled "DEPOSIT". A user may provide input via an input module such as, for example, the I/O module 230, in order to interact with the presentation 900. Such input may, for example, be received via the display 102 such as, for example, where the display 102 is a touch sensitive display module (touchscreen). It may be that an indication of the simulated negotiation of the negotiable instrument is provided responsive to such input. For example, such an indication may be provided responsive to an interaction with the control 910. Such an indication may include presenting a user interface simulating a remote deposit of the simulated negotiable instrument depicted in the presentation 900 (i.e., the example negotiable instrument 700).

In another example, a remote deposit capture interface for negotiable instruments may be simulated that includes an automatic image capture feature. As an example of providing such a simulated feature, further images of portions of the environment (or even a single further image) may be captured by the mobile computing device 100 such as, for example, as may be captured in providing an augmented reality interface responsive to repositioning of the mobile computing device 100 as discussed above. It may be that the automatic capture of the negotiable instrument is simulated to occur when the augmented reality presentation reflects that the entirety of the negotiable instrument is in a defined position in the augmented reality world/in the presentation thereof by the mobile computing device 100. Accordingly, capture (and then simulated negotiation) may occur responsive to detecting that the negotiable instrument is within a defined positioned in the screen display. Since the position of the negotiable instrument in the screen display may correspond to the position of the printed collateral in the environment, the condition for simulating capture and negotiation may be a detection that one of the further captured images of portions of the environment includes the entirety of the printed collateral in a defined position within that further image. When, responsive to such detecting, the indication of the outcome of the simulated negotiation of the negotiable instrument is presented, that presenting may include presenting a user interface simulating a remote deposit as mentioned above.

Figure 10:
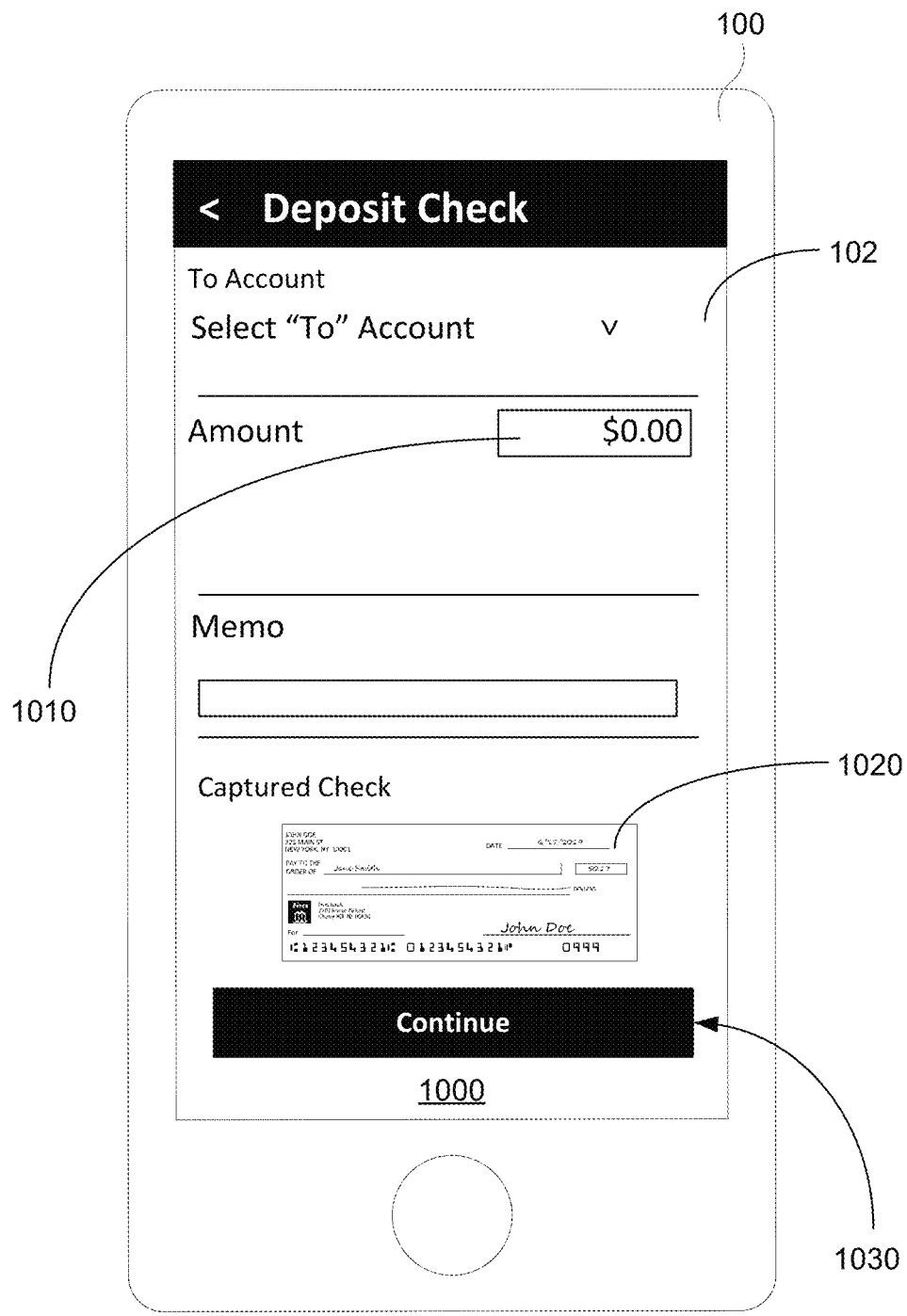
FIG. 10 shows a user interface for configuring a simulated remote deposit of a simulated negotiable instrument.

In some implementations, the simulation of remote deposit may include elements beyond the capture of an image of negotiable instrument. For example, user interface for configuring the remote deposit may be provided. An example of such a user interface is shown in FIG. 10. In FIG. 10, the display 102 of the mobile computing device 100 includes a user interface 1000. A user may be expected to, for training purposes, configure the remote deposit using a user interface such as the user interface 1000. For example, input for configuring the remote deposit of the negotiable instrument may be received by the mobile computing device 100. Such input may correspond to one or more interactions with a user interface such as, for example, the user interface 1000. Such input may, for example, be received by way of an input device such as, for example, the I/O module 230. In a particular example, touch input may be received using the display 102 where the display 102 is touch sensitive. The received input may take a variety of forms. For example, a user may provide input interacting with an input control 1010 to specify the amount of the negotiable instrument being deposited. Beyond input controls, the user interface 1000 may include other elements. For example, the user interface 1000 includes a view 1020 of the simulated captured image of the negotiable instrument. A user may inspect the view 1020 such as to verify the instrument was successfully captured. Other functionality may also be provided. For example, the user may be permitted to "retake" the image of the negotiable instrument. Once the user has completed configuration of the deposit using the user interface 1000, the user may signal this to the mobile computing device 100. For example, input may be provided interacting with a designated user interface control such as, for example, the button 1030.

As a part of the training, input received via such a configuration user interface may be compared to values related to a given simulated negotiable instrument. For example, it could be determined whether the received input matches values related to the negotiable instrument such as, for example, "known good" values for that negotiable instrument.

Figure 11B:
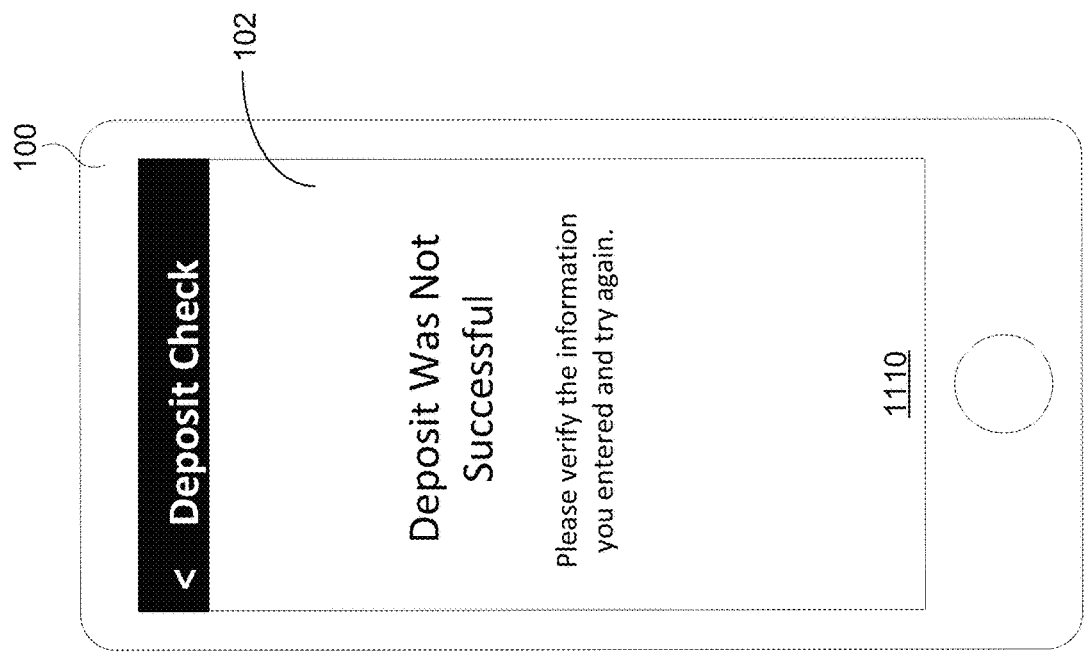
FIG. 11A and FIG. 11B show example user interfaces for indicating the success and failure, respectively, of a remote deposit of a simulated negotiable instrument.
Figure 11A:
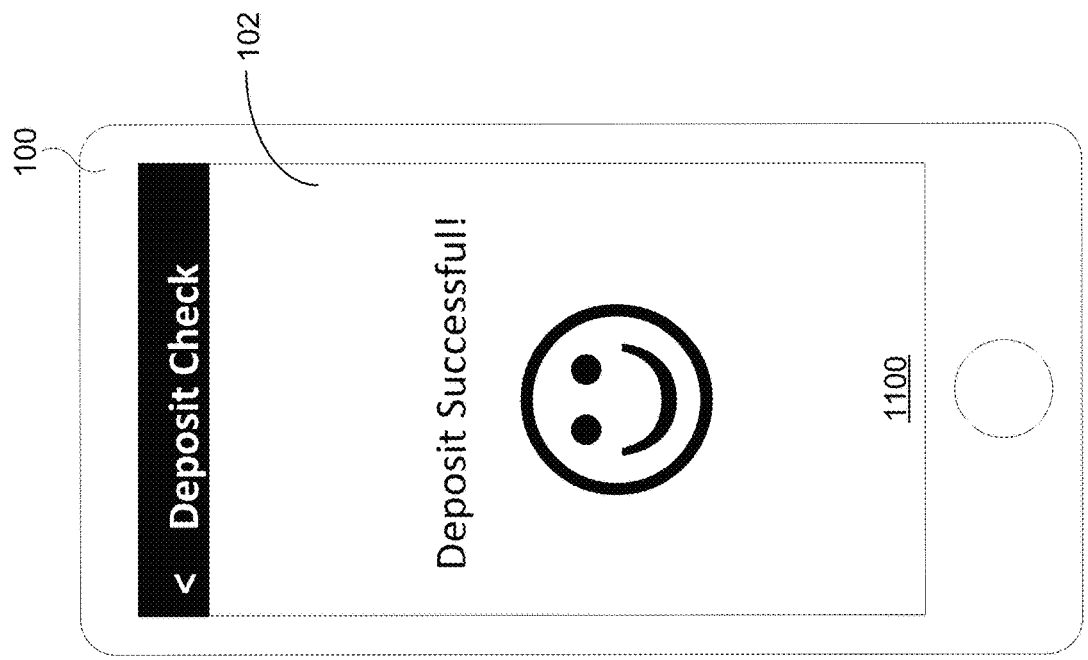

Further, as a part of simulating a remote deposit, an indication may be provided as to whether a simulated deposit was "successful" (i.e., would have been accepted for deposit in real life/outside the simulation if a corresponding actual remote deposit of the simulated negotiable instrument was attempted in circumstances corresponding to those of the simulation). Such an indication could, for example, be based, in whole or in part, on whether received input for configuring the deposit as discussed above matched the values related to the negotiable instrument (e.g., "known good" values). An example of a providing an indication of a successful deposit is shown in FIG. 11A which depicts the display 102 of the mobile computing device 100 showing a presentation 1100. An example of providing an indication of an unsuccessful (failed) deposit is shown in FIG. 11B which depicts the display 102 of the mobile computing device 100 showing a presentation 1110.

The above is an example of how an augmented reality training simulation may be provided related to mobile deposits. The above example is capable of variation without deviating from the subject matter of the present application. For example, the various example user interfaces discussed above may include different and/or additional elements to those depicted above. In a particular example, user interfaces may provide/include tips (e.g., things to look for, common mistakes, etc.) and/or instructions (e.g., what to do) at various stages and/or throughout the simulation.

Now, turning to a second example of training related to negotiable instrument negotiation, training may be provided related to in-person deposits. The audience for such training may include financial institution personnel such as, for example, bank tellers and/or bank officers.

In a particular example, a simulation according to the present application may be provided to provide training related to detection of potentially fraudulent deposits. In such a simulation, a user may be provided with one or more simulations (e.g., in sequence) corresponding to different deposit scenarios. In some of all of those scenarios, a simulated negotiable instrument may be presented corresponding to potential fraud. For example, it may be that the simulated negotiable instrument presented in augmented reality for a given scenario may include one or more indicia or potential fraud.

Figure 12:
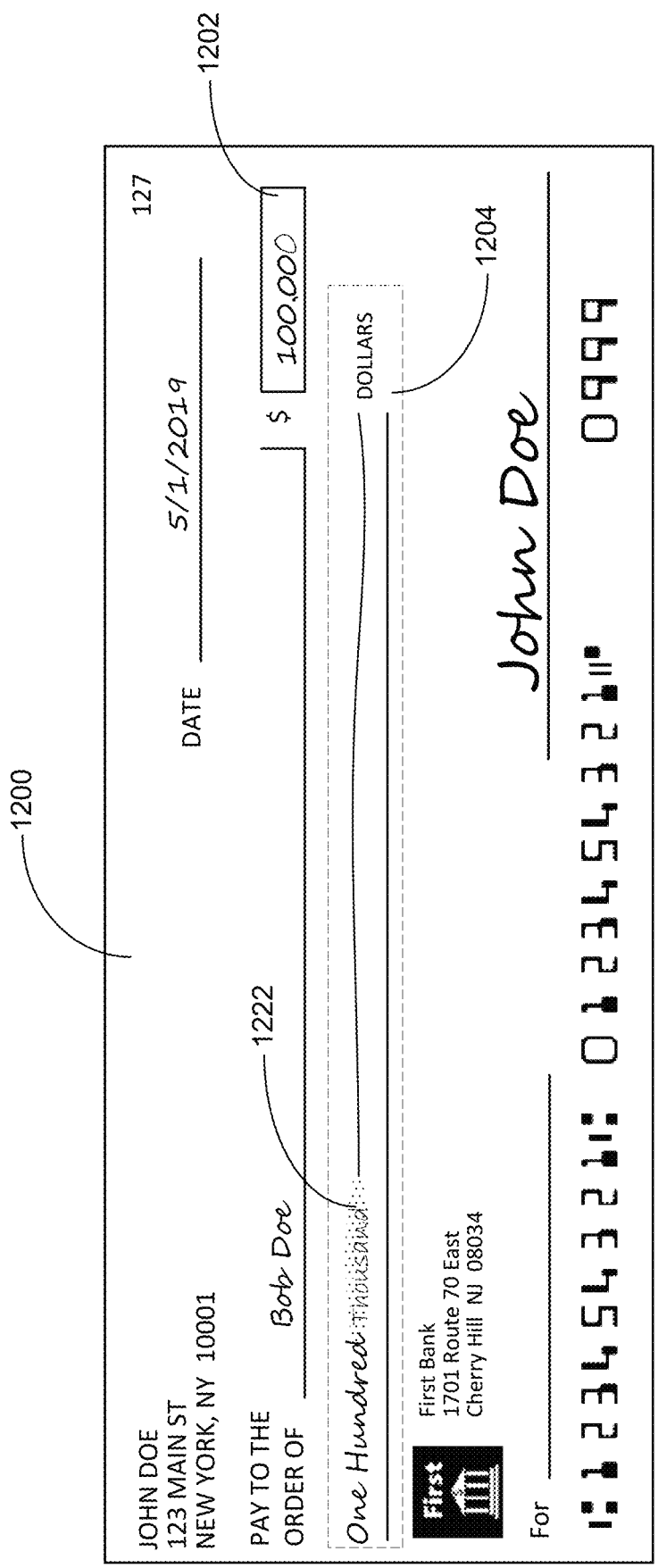
FIG. 12 shows another example negotiable instrument featuring indicia of potential fraud.

An example negotiable instrument 1200 including indicia of potential fraud is depicted in FIG. 12.

Notably, the example negotiable instrument 1200 includes similar elements to the example negotiable instrument 700 (FIG. 7) including a convenience amount 1202 (corresponding to the convenience amount 702) and a legal amount 1204 (corresponding to the legal amount 704). An augmented reality presentation depicting the example negotiable instrument 1200 may be provided in manners similar to as was discussed above using the example of the example negotiable instrument 700. However, in contrast to the example negotiable instrument 700, the example negotiable instrument 1200 includes clear indications of potential fraud.

In particular, a careful observer may note that the convenience amount 1202 includes a final zero in different handwriting from the other characters in that field. Further, the shape of the comma in the value in the convenience amount 1202 suggests that period may have been changed into a comma. Taken together these features suggest possible tampering with the convenience amount such as, for example, an attempt to change a check for $100.00 into one for $100,000.

A careful observer may also note possible tampering with the legal amount 1204. As illustrated, the example negotiable instrument 1200 includes an erasure mark 1222 suggesting possible use of an eraser, a razor blade, and/or chemical substances to remove elements from the face of the check and, in particular, from the area of the legal amount 1204. Further, the word "thousand" in the legal amount 1204 appears in different handwriting from the words "One Hundred". Taken together, these features are also consistent with possible tampering related to an attempt to change a check for $100 into one for $100,000.

Figure 13:
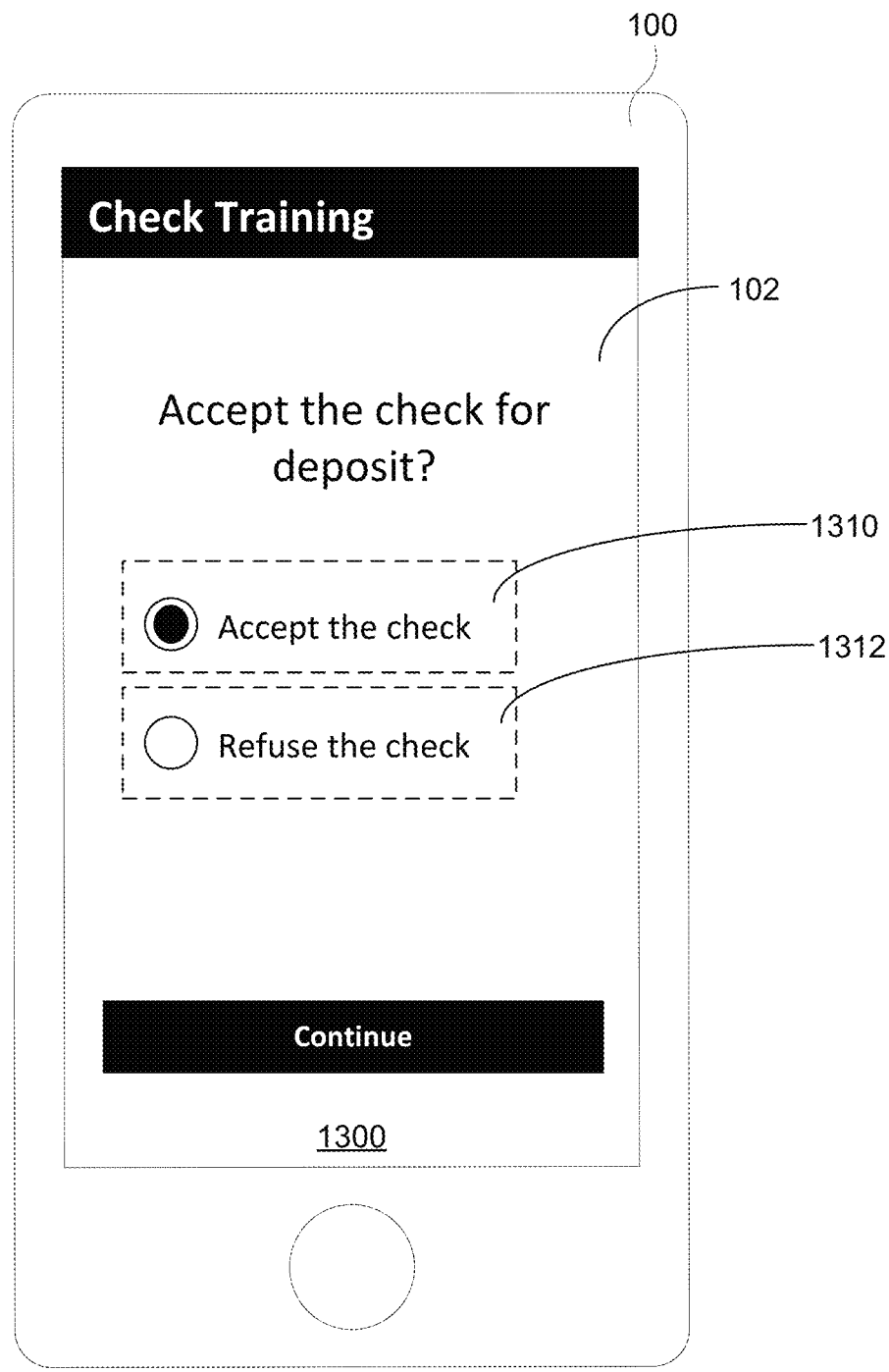
FIG. 13 shows an example user interface including options to accept and to not accept a negotiable instrument for deposit.

A person being trained using the simulation (e.g., a bank teller being trained) may be expected to review the simulated negotiable instrument of a given scenario using the augmented reality display to decide whether or not to accept it for deposit. User interface may be provided allowing the trainee to provide input indicating their selection. An example of a possible user interface is depicted in FIG. 13 which shows a user interface 1300 displayed on the display 102 of the mobile computing device 100. As illustrated, the user interface 1300 includes a set of options related to whether or not a negotiable instrument (referred to in the example of FIG. 13 as a check). In particular, the user interface 1300 includes a first control 1310 providing a first option to accept the negotiable instrument for deposit ("Accept the check"). The user interface 1300 also includes a second control 1312 providing an option to not accept the negotiable instrument for deposit ("Refuse the check"). A user may provide input indicating a selection between the options by providing input selecting one of the options (e.g., one of the first and second options). Such input may, for example, be received by an input module such as for example using the I/O module 230. In a particular example, input may be provided using the display 102 such as, for example, where the display 102 is a touch screen.

In order to provide feedback on the training, after the user has selected an option, feedback may be provided as to the outcome of the simulated deposit. For example, it could be that presenting the indication of the outcome of the simulated negotiation includes presenting an indication as to whether accepting the negotiable instrument for negotiation would further a fraud. Notably, because the trainee may choose whether or not accept the negotiable instrument for negotiation and because the negotiable instrument may or may not be fraudulent, there are at least four possible outcomes for any simulation of negotiation of the negotiable instrument taking into account the selection of the user (trainee): acceptance of a non-fraudulent negotiable instrument, acceptance of a potentially-fraudulent negotiable instrument, rejection of a potentially-fraudulent negotiable instrument, and rejection of a non-fraudulent negotiable instrument. Example user interfaces as may presented corresponding to possible outcomes will now be discussed with reference to FIGS. 14A-14D.

Figure 14A:
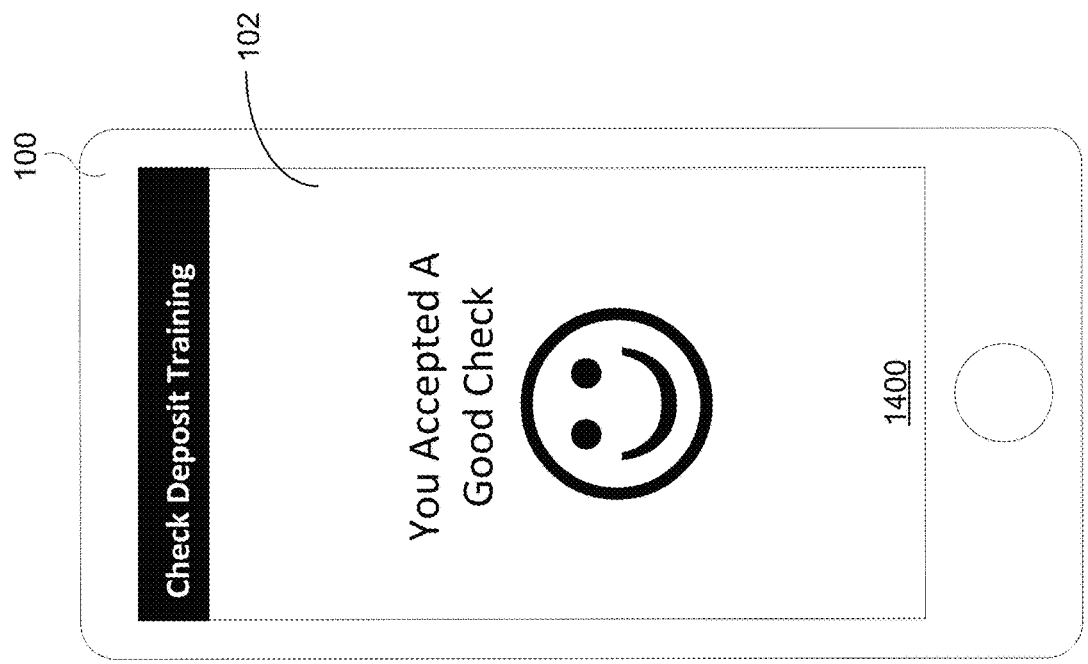
FIG. 14A, FIG. 14B, FIG. 14C and FIG. 14D show example user interfaces for indicating outcomes of acceptance of a given negotiable instrument for deposit.

FIG. 14A depicts an example user interface 1400 that may be presented by the mobile computing device 100 using the display 102 in the case where a trainee correctly selects to accept a non-fraudulent negotiable instrument.

Figure 14B:
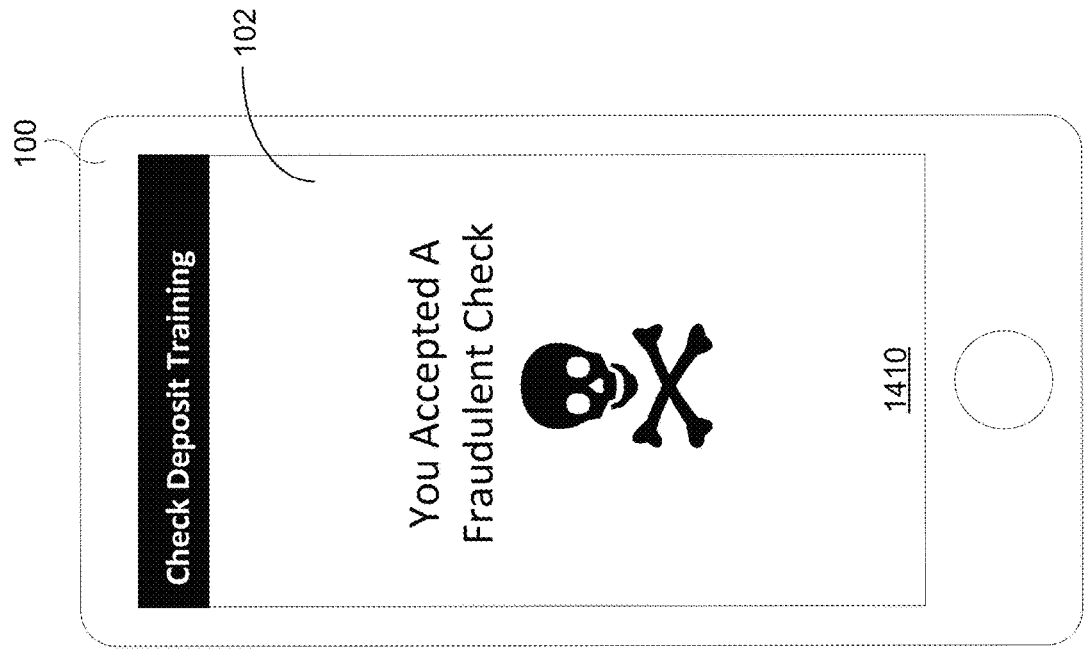

FIG. 14B depicts an example user interface 1410 that may be presented by the mobile computing device 100 using the display 102 in the case where a trainee incorrectly selects to accept a fraudulent negotiable instrument.

Figure 14C:
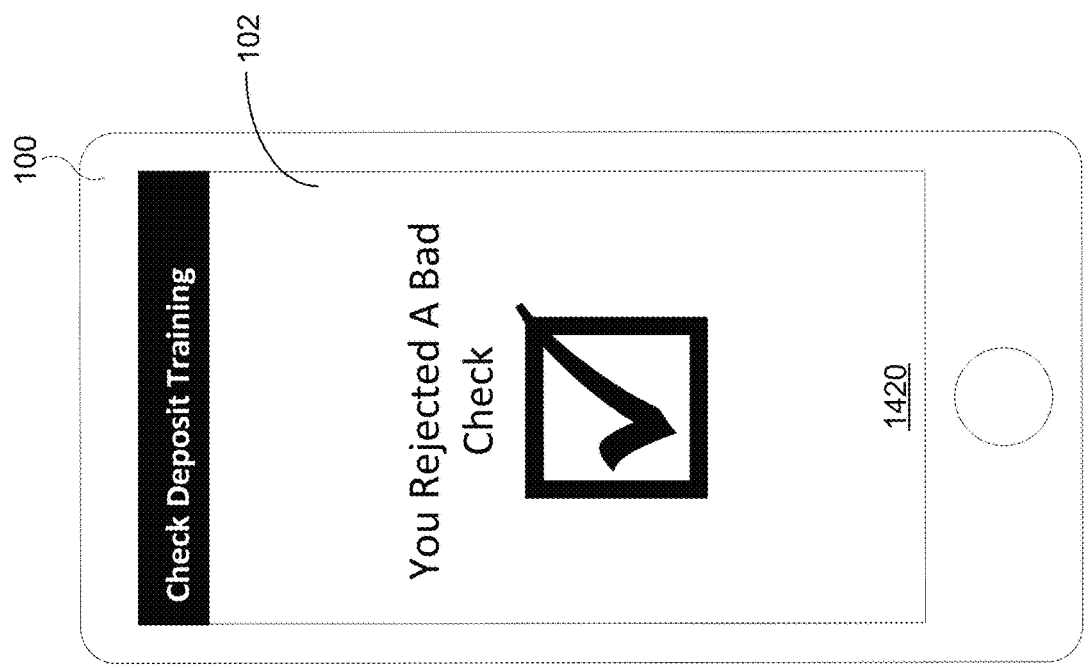

FIG. 14C depicts an example user interface 1420 that may be presented by the mobile computing device 100 using the display 102 in the case where a trainee correctly selects to reject a fraudulent negotiable instrument.

Figure 14D:
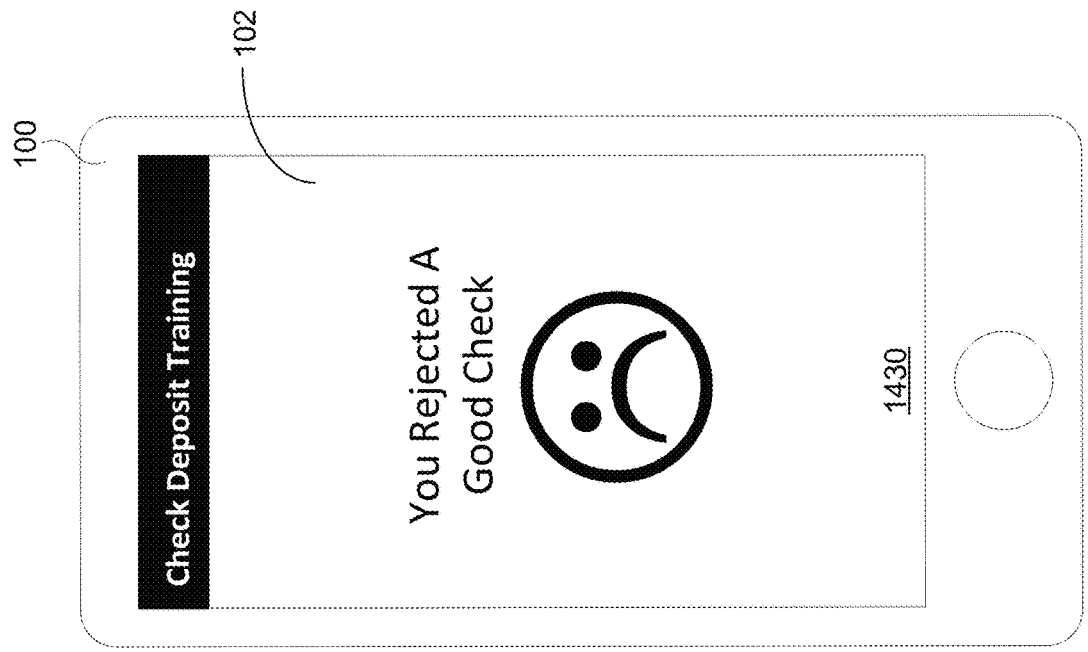

FIG. 14D depicts an example user interface 1430 that may be presented by the mobile computing device 100 using the display 102 in the case where a trainee incorrectly selects to reject a non-fraudulent negotiable instrument.

The above is an example of how an augmented reality training simulation may be provided related to deposit of potentially fraudulent negotiable instruments. The above example is capable of variation without deviating from the subject matter of the present application. For example, the various user interfaces discussed above may include different and/or additional elements to those depicted above. In a particular example, user interfaces may include/provide tips (e.g., things to watch for, top 10 signs of a fraudulent transaction, etc.) and/or instructions (e.g., what to do, a walkthrough of one or more of the scenarios) at various stages and/or throughout the simulation.

In another example, rather than providing a separate user interface allowing a user to choose whether or not to accept a negotiable instrument such a user interface may be provided together with the augmented reality presentation (e.g., as includes the simulated negotiable instrument). For example, the options could be presented in augmented reality alongside the simulated negotiable instrument (e.g., using the display 102).

In another example of a possible variation in providing an augmented reality training simulation related to deposit of potentially fraudulent negotiable instruments, a person attempting to deposit the negotiable instrument may be simulated. A trainee may be expected to, in addition (or as alternative to) inspecting the simulated negotiable instrument, observe the behavior of the simulated person in order to determine whether an attempt to negotiable a simulated negotiable instrument may constitute a possible fraud.

Figure 15:
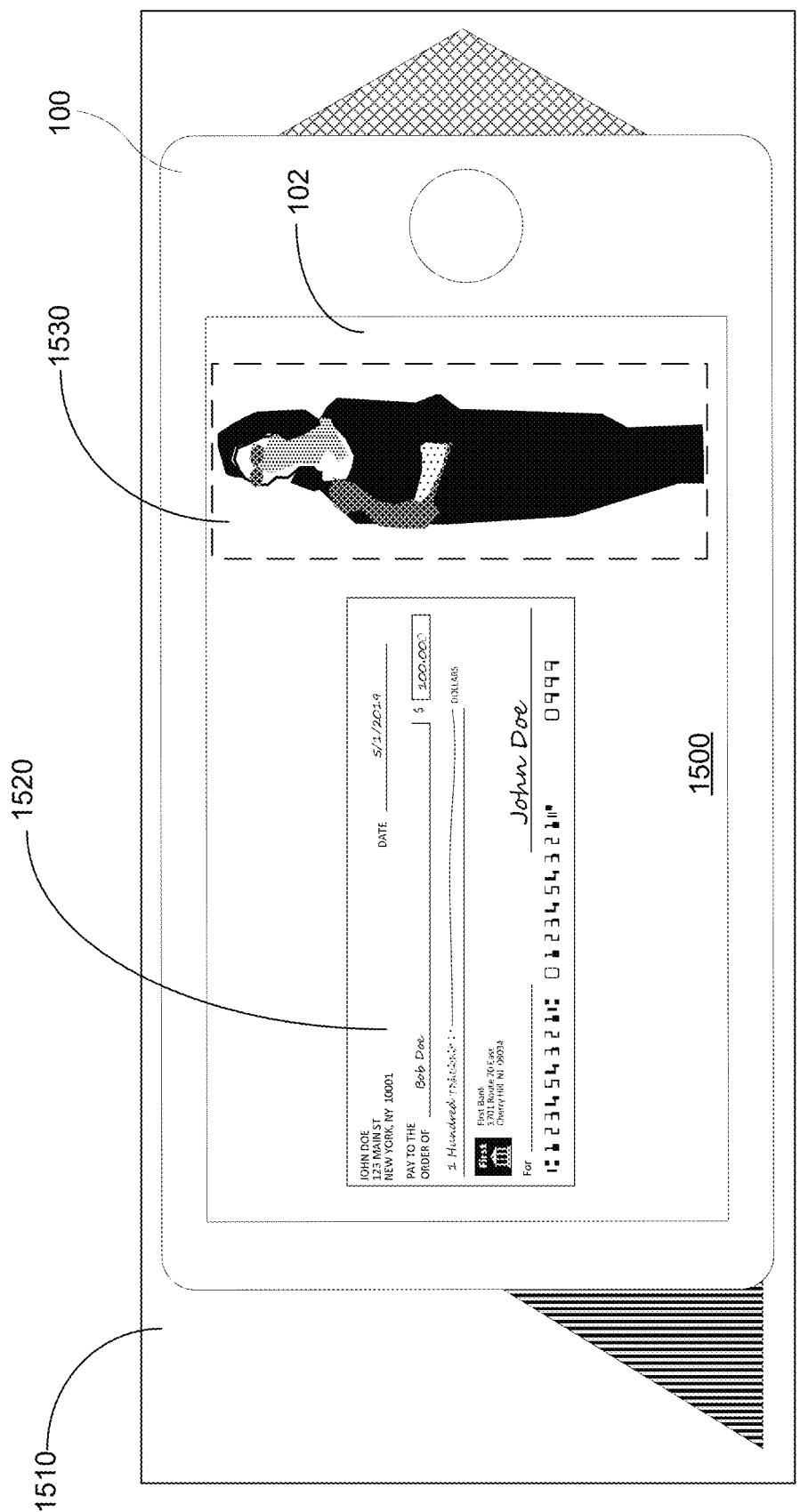
FIG. 15 shows an augmented reality presentation of a simulated negotiable instrument including an animation of a person attempting to negotiate the negotiable instrument.

A simulation of a person attempting to deposit a negotiable instrument may be provided in a variety of manners. For example, simulation of the augmented reality environment may also include an animation of a person attempting to negotiable the negotiable instrument such as may, for example, be provided by compositing images of portions of the environment captured using the image capture module with an animation of a person attempting to negotiate the negotiable instrument. Notably, such an animation may be provided separately and/or together with the presentation of the simulated negotiable instrument in augmented reality. For example, it could be that the person is simulated as being in a defined position relative to the observer in the environment (e.g., relative to the mobile computing device 100 in the environment) and/or relative to the piece of printed collateral in the environment. In another example, the augmented reality presentation may occupy a first portion of the display 102 while the animation of the person is presented alongside the display of the augmented reality version of the environment in a second portion of the display 102. Such an example is depicted in FIG. 15 in which a presentation 1500 is provided on the display 102 of the mobile computing device 100 including an augmented reality presentation of a simulated negotiable instrument 1520 (which replaces a piece of printed collateral 1510) has alongside it an animation 1530 of a customer presenting the negotiable instrument 1520 for deposit in a second portion of the display 102.

Figure 16:
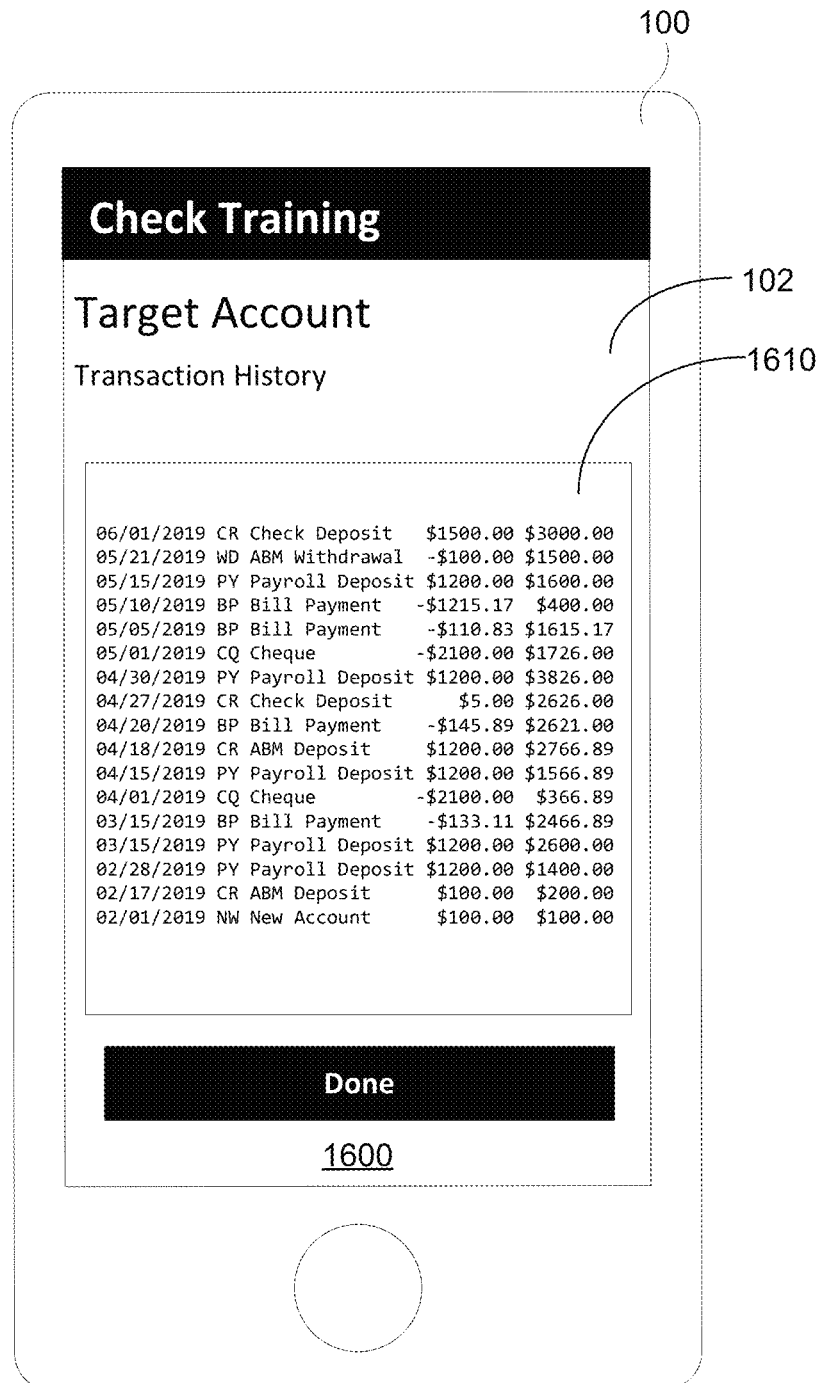
FIG. 16 shows a user interface for presenting transaction history information related to a simulated account into which a negotiable instrument may be deposited.

In another example of a possible variation in providing an augmented reality training simulation related to deposit of potentially fraudulent negotiable instruments, a trainee may also be provided with other information related to the negotiable instrument and/or information related to the person attempting to make the deposit and/or information related to an account such as, for example, the account into which the person is attempting to deposit the negotiable instrument. For example, the trainee may be permitted to review information related to a simulated account. In a particular example, the trainee may be provided with user interface allowing review of recent transactions on the target account for the deposit akin to what a teller might review such as, for example, in order to determine whether or not a proposed deposit is typical for that account (e.g., potentially corresponding to a regular/recurring deposit) and thus perhaps less likely to be considered aberrant/potentially fraudulent. An example of such a user interface is provided in FIG. 16 which depicts a user interface 1600 displayed using the display 102 of the mobile computing device 100. As illustrated, the user interface 1600 displays a transaction listing 1610. A user interface such as the user interface 1600 may be presented responsive to user input such as may, for example, be received via an input module. Responsive to received input (e.g., responsive to input received via an input module), information such as, for example, information related to a simulated account into which the person attempting to negotiate the simulated negotiable instrument is attempting to deposit it.

In another example of a possible variation in providing an augmented reality training simulation related to deposit of potentially fraudulent negotiable instruments, outputs selected by trainees with regard to particular training examples may be collected in order to form a set of responses related to one or more training examples. Put differently, user responses to training scenarios may be collected to generate a data set reflective of whether given simulated negotiable instruments (and/or simulated negotiable instruments in tandem with particular simulated behaviour by a person attempting to deposit it and/or in tandem with particular information related into an account) were identified, correctly or incorrectly, as fraudulent/non-fraudulent. Such a data set, potentially along with other information such as, for example, the expected response to a given scenario, may then be employed as training data for a machine learning algorithm. A system employing the results of that machine learning may then be employed to further enhance training and/or in generating a machine-based recognizer of potentially-fraudulent negotiable instruments. Notably, such a machine learning algorithm may be executed on a device other than the mobile computing device 100 such as, for example, on a server operating on a data set including responses collected by one or more mobile computing devices running the training simulator. Additionally or alternatively, it may be that a computing device other than a mobile computing device (e.g., a desktop PC) is employed in providing the simulator and that the machine learning algorithm training may run and/or be directed by such a computing device.

In another example of a possible variation on the example embodiments discussed herein, other sorts of augmented reality devices may be employed other a bare mobile device like mobile computing device 100. An example alternative augmented reality device will now be described with reference to FIGS. 17A and 17B.

Figure 17A:
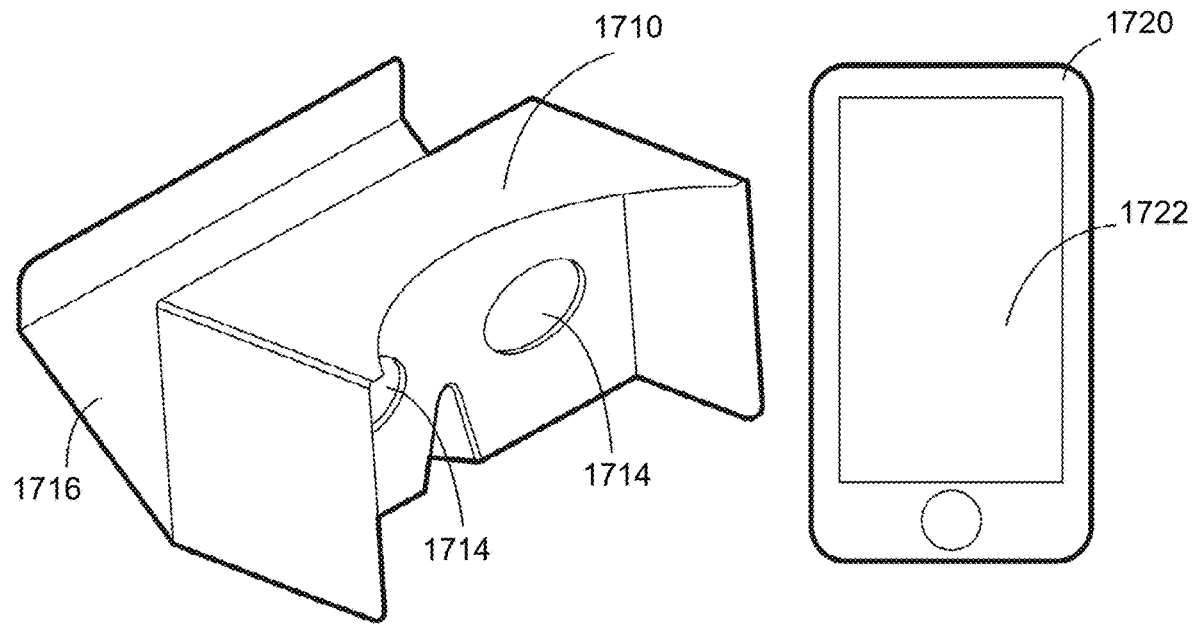
FIGS. 17A and 17B show an augmented reality device in partially assembled and assembled states, respectively.
Figure 17B:
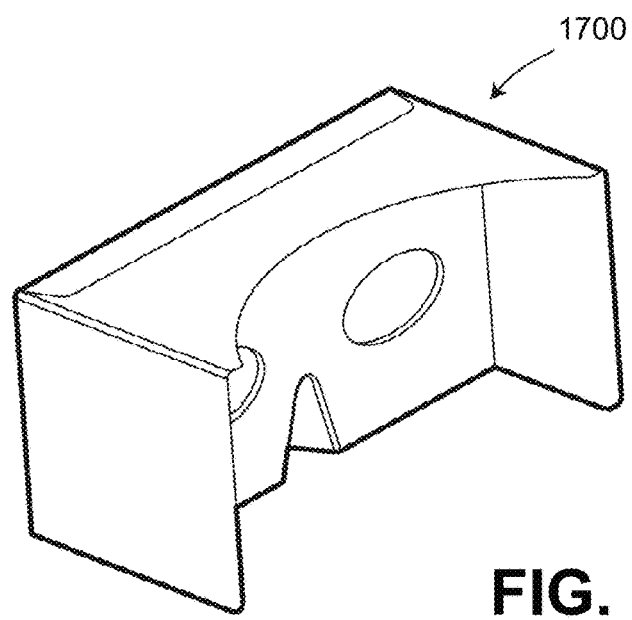

As best shown in FIG. 17A, an augmented reality device 1700 may be formed using a kit consisting of a frame 1710 and a smartphone 1720. The smartphone 1720 may be the same or similar to the mobile computing device 100. The smartphone 1720 may be inserted into a compartment or cavity with a screen 1722 of the smartphone 1720 facing towards a pair of viewports 1714. A rear door 1716 of the frame 1710 may then be closed as shown in FIG. 17B. As such, the augmented reality device 1700, when assembled, includes a virtual-reality headset frame (the frame 1710) and the smartphone 1720 which is mounted in the frame 1710. Notably, the augmented reality device 1700 may be worn or donned such as, for example, by holding it up to or mounting it against the face of a user. As such, the augmented reality device 1700 may be considered a wearable augmented reality device.

The frame 1710 may be made of a variety of materials such as, for example, cardboard or a suitable plastic such as, for example, ethylene-vinyl acetate (EVA). Further, it may be that plastic or glass lenses are provided at the viewports 1714. In a particular example, the frame 1710 may be a Google™ Cardboard frame or similar.

The wearable augmented reality device 1700 includes a pair of viewports 1714 through which a view may look to view images displayed by the screen 1722. Further, the smartphone 1720 may include an accelerometer. Notably, where the augmented reality device 1700 is worn on the head of a user, the accelerometer of the smartphone 1720 may register movement of the user's head allowing the head of a viewer to be tracked. For example, the user could wear the augmented reality device 1700 by pressing it against their face and holding it in place with their hands as they look through it and have movements of their head registered by such an accelerometer. In another example, the smartphone 1720 may include one or more cameras akin to the camera 140 as may be employed to capture images of portions of an environment that will be presented in augmented reality. Additionally, smartphone 1720 is a computing device and may, therefore, serve a similar purpose and potentially provide similar functionality to the mobile computing device 100 in terms of performing operations such as, for example, operations corresponding to one or both of the method 400 (FIG. 4) and the method 500 (FIG. 5).

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
a processor;
an input module coupled to the processor;
an image capture module coupled to the processor;
a display module coupled to the processor; and
a memory module coupled to the processor and storing instructions that, when executed by the processor, cause the computer system to:
capture, using the image capture module, one or more images of portions of an environment including at least a portion of a printed collateral;
display an augmented reality version of the environment using the display module, wherein displaying the augmented reality version of the environment includes:
overlaying the printed collateral with an image of a first negotiable instrument to yield an image depicting a portion of the environment as including the first negotiable instrument,
presenting, using the display module, a first option to accept the first negotiable instrument for deposit and a second option to not accept the first negotiable instrument for deposit; and
receiving, via the input module, input selecting one of the first and second options; and
provide an indication of whether the selection was appropriate.

2. The computer system of claim 1, wherein the printed collateral is a non-negotiable instrument.

3. The computer system of claim 1, wherein the printed collateral is a brochure.

4. The computer system of claim 3, wherein the indication of whether the selection is appropriate indicates that the first negotiable instrument should not have been accepted for deposit.

5. The computer system of claim 4, wherein providing the indication includes presenting an indication as to whether accepting the first negotiable instrument for negotiation would further a fraud.

6. The computer system of claim 1, wherein displaying the augmented reality version of the environment further includes:
compositing one or more images of portions of the environment captured using the image capture module with an animation.

7. The computer system of claim 1, wherein the memory module stores further instructions that, when executed by the processor further cause the computer system to:
responsive to input received via the input module, present, using the display module, information related to a simulated account.

8. The computer system of claim 1, wherein the first negotiable instrument is one of a check, a money order, or a draft.

9. A computer-implemented method comprising:
capturing, using an image capture module, one or more images of portions of an environment including at least a portion of the printed collateral;
displaying an augmented reality version of the environment, wherein displaying the augmented reality version of the environment includes:
overlaying the printed collateral with an image of a first negotiable instrument to yield an image depicting a portion of the environment as including the first negotiable instrument, and
presenting, using the display module, a first option to accept the first negotiable instrument for deposit and a second option to not accept the first negotiable instrument for deposit; and
receiving, via the input module, input selecting one of the first and second options; and
provide an indication of whether the selection was appropriate.

10. The computer-implemented method of claim 9, wherein the printed collateral is a non-negotiable instrument.

11. The computer-implemented method of claim 9, wherein the printed collateral is a brochure.

12. The computer-implemented method of claim 9, wherein the first negotiable instrument includes one or more indicia of potential fraud.

13. The computer-implemented method of claim 12, wherein the indication of whether the selection is appropriate indicates that the first negotiable instrument should not have been accepted for deposit.

14. The computer-implemented method of claim 13, wherein providing the indication includes presenting an indication as to whether accepting the first negotiable instrument for negotiation would further a fraud.

15. The computer-implemented method of claim 9, wherein displaying the augmented reality version of the environment further includes:
compositing one or more images of portions of the environment captured using the image capture module with an animation.

16. The computer-implemented method of claim 9, further comprising:
responsive to input received via the input module, presenting information related to a simulated account.

17. The computer-implemented method of claim 9, wherein the first negotiable instrument is one of a check, a money order, or a draft.

18. A non-transitory computer-readable storage medium storing instructions that, when executed by a processor of a computing device, cause the computing device to:
capture, using an image capture module, one or more images of portions of an environment including at least a portion of a printed collateral;
display an augmented reality version of the environment using a display module, wherein displaying the augmented reality version of the environment includes:
overlaying the printed collateral with an image of a first negotiable instrument to yield an image depicting a portion of the environment as including the first negotiable instrument; and
presenting, using the display module, a first option to accept the first negotiable instrument for deposit and a second option to not accept the first negotiable instrument for deposit; and receiving, via the input module, input selecting one of the first and second options; and provide an indication of whether the selection was appropriate.

19. The non-transitory computer-readable storage medium of claim 18, wherein the printed collateral is a non-negotiable instrument.

20. The non-transitory computer-readable storage medium of claim 18, wherein the printed collateral is a brochure.

21. The computer system of claim 1, wherein the first negotiable instrument includes one or more indicia of potential fraud.

\* \* \* \* \*